United States Patent
Meshkati et al.

(10) Patent No.: US 9,706,473 B2
(45) Date of Patent: Jul. 11, 2017

(54) METHOD AND APPARATUS FOR MITIGATING INTERFERENCE IN FEMTOCELL DEPLOYMENTS

(71) Applicant: QUALCOMM Incorporated, San Diego, CA (US)

(72) Inventors: Farhad Meshkati, San Diego, CA (US); Yan Zhou, San Diego, CA (US); Vinay Chande, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/872,779

(22) Filed: Oct. 1, 2015

(65) Prior Publication Data
US 2016/0029293 A1    Jan. 28, 2016

Related U.S. Application Data

(62) Division of application No. 13/170,488, filed on Jun. 28, 2011, now Pat. No. 9,185,619.
(Continued)

(51) Int. Cl.
*H04M 1/66* (2006.01)
*H04M 1/68* (2006.01)
(Continued)

(52) U.S. Cl.
CPC .......... *H04W 48/02* (2013.01); *H04B 17/345* (2015.01); *H04W 36/20* (2013.01);
(Continued)

(58) Field of Classification Search
CPC ..... H04W 48/02; H04W 36/20; H04W 80/08; H04W 84/105; H04W 88/10; H04W 48/08; H04W 84/045; H04B 17/345
See application file for complete search history.

(56) References Cited

U.S. PATENT DOCUMENTS

| 8,050,629 B2 | 11/2011 | Foster et al. |
| 2004/0209585 A1* | 10/2004 | Wang ................. H04B 17/345 455/226.1 |

(Continued)

FOREIGN PATENT DOCUMENTS

| CN | 1666540 A | 9/2005 |
| EP | 2180739 A1 | 4/2010 |

(Continued)

OTHER PUBLICATIONS

"3GPP TR 25.820 V8.2.0; 3rd Generation Partnership Project; Technical Specification Group Raclio Access Networks 3G Home NodeB Study Item Technical Report (Release 8 )", 3GPP TR 25.820 V8.2.0,vol. 25.820, No. v8.2.0, Sep. 1, 2008 (Sep. 1, 2008) XP002525355, paragraphs [ 5 . 2 . 3 ] , [4.2.4], [5.3.4], [5.3.6].

(Continued)

*Primary Examiner* — Ajit Patel
(74) *Attorney, Agent, or Firm* — Ashish L. Patel

(57) ABSTRACT

Methods and apparatuses are provided for mitigating interference among access points, and/or devices communicating therewith, in unplanned network deployments. Based on determining that one or more served devices potentially interfere with one or more access points, an inter-frequency handover (IFHO) threshold or data rate can be adjusted for the device to cause IFHO or reduce occurrence of interference, and/or a coverage area can be modified so the device can communicate with one or more other access points to mitigate potential interference. Based on determining interference from one or more devices served by other access points, an access point can switch operating modes to a hybrid or open access point to allow the one or more devices to handover to the access point, and/or can boost downlink transmit power to cause the one or more devices to perform (Continued)

IFHO from the other access points to mitigate potential interference.

25 Claims, 19 Drawing Sheets

Related U.S. Application Data

(60) Provisional application No. 61/359,754, filed on Jun. 29, 2010.

(51) Int. Cl.

| | | |
|---|---|---|
| H04M 3/16 | (2006.01) | |
| H04W 48/02 | (2009.01) | |
| H04W 36/20 | (2009.01) | |
| H04B 17/345 | (2015.01) | |
| H04W 48/08 | (2009.01) | |
| H04W 80/08 | (2009.01) | |
| H04W 84/04 | (2009.01) | |
| H04W 84/10 | (2009.01) | |
| H04W 88/10 | (2009.01) | |

(52) U.S. Cl.
CPC ............ H04W 48/08 (2013.01); H04W 80/08 (2013.01); H04W 84/045 (2013.01); H04W 84/105 (2013.01); H04W 88/10 (2013.01)

(56) References Cited

U.S. PATENT DOCUMENTS

| | | | |
|---|---|---|---|
| 2006/0194546 A1 | 8/2006 | Gunnarsson et al. | |
| 2008/0062925 A1 | 3/2008 | Mate et al. | |
| 2009/0042594 A1 | 2/2009 | Yavuz et al. | |
| 2009/0104912 A1 | 4/2009 | Foster et al. | |
| 2009/0197631 A1 | 8/2009 | Palanki et al. | |
| 2009/0270109 A1 | 10/2009 | Wang et al. | |
| 2010/0233962 A1 | 9/2010 | Johansson et al. | |
| 2010/0309864 A1* | 12/2010 | Tamaki .................. | H04W 52/42 370/329 |
| 2011/0013568 A1* | 1/2011 | Yim ...................... | H04W 28/16 370/329 |
| 2011/0081865 A1* | 4/2011 | Xiao .................. | H04W 52/243 455/63.1 |
| 2011/0244863 A1 | 10/2011 | Matsuo et al. | |
| 2011/0319084 A1 | 12/2011 | Meshkati et al. | |
| 2012/0320882 A1 | 12/2012 | Sankar et al. | |
| 2014/0179324 A1 | 6/2014 | Lee | |

FOREIGN PATENT DOCUMENTS

| | | |
|---|---|---|
| JP | 2007097055 A | 4/2007 |
| JP | 2010124462 A | 6/2010 |
| WO | WO-03094544 A1 | 11/2003 |
| WO | 2009026162 A1 | 2/2009 |
| WO | WO-2009023596 A2 | 2/2009 |
| WO | WO-2009099813 A1 | 8/2009 |
| WO | WO-2009142954 A1 | 11/2009 |
| WO | WO-2010013055 A1 | 2/2010 |
| WO | WO-2010036188 A1 | 4/2010 |
| WO | WO-2010054339 A2 | 5/2010 |
| WO | WO-2010070854 A1 | 6/2010 |
| WO | WO-2010087172 A1 | 8/2010 |

OTHER PUBLICATIONS

Alcatel-Lucent, "Simulation results of macro-cell and co-channel Home NodeB with power configuration and open access [online]", 3GPP TSG-RAN WG4#44bi R4-071578, pp. 1-8, URL: http://www.3gpp.org/ftp/tsg_ran/WG4_Radio/TSGR4_44bis/Docs/R4-071578.zip, Oct. 16, 2007.
European Search Report—EP13193797—Search Authority—The Hague—Jan. 3, 2014.
European Search Report—EP14177307—Search Authority—The Hague—Sep. 25, 2014.
European Search Report—EP15165035—Search Authority—The Hague—Aug. 6, 2015.
International Search Report and Written Opinion—PCT/US2011/042462, International Search Authority—European Patent Office—Oct. 14, 2011.
Mitsubishi Electric: "HeNBs and X2 interface", 3GPP Draft; R3-082476 (X2 for HNBS), 3rd Generation Partnership Project (3GPP),Mobile Competence Centre: 650, Route Des Lucioles ; F-06921 Sophia-Antipolis Cedex ; France, No. Prague, Czech Republic; 20080924, Sep. 24, 2008 (Sep. 24, 2008), XP050323765.
Taiwan Search Report—TW100122919—TIPO—Nov. 5, 2013.
Texas Instruments: "Views on PDCCH Interference Mitigation for Het-Nets", 3GPP Draft; RI-103713 TI HETNETS PDCCH Interference Mitigation, 3rd Generation Lucioles ; F-06921 Sophia-Antipolis Cedex ; France, vol. RAN WG1, No. Dresden, Germany; 20100628, Jun. 22, 2010 (Jun. 22, 2010), XP050449145.

\* cited by examiner

METHOD AND APPARATUS FOR MITIGATING INTERFERENCE IN FEMTOCELL DEPLOYMENTS

CLAIM OF PRIORITY UNDER 35 U.S.C. §119

The present application is a divisional application of U.S. patent application Ser. No. 13/170,488 filed on Jun. 28, 2011, titled "Method and apparatus for mitigating interference in femtocell deployments" which claims the benefit to U.S. Provisional Application No. 61/359,754 filed on Jun. 29, 2010, titled "Enhanced uplink interference management" and assigned to the assignee hereof and hereby expressly incorporated by reference herein.

BACKGROUND

Field

The following description relates generally to wireless network communications, and more particularly to mitigating interference in femtocell deployments.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional base stations, additional restricted access points can be deployed to provide more robust wireless coverage to mobile devices. For example, wireless relay stations and low power base stations (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

In this regard, deployment of such low power base stations is unplanned in many cases, and thus the base stations and/or mobile devices communicating therewith can cause interference to other low power base stations, macrocell base stations, or other devices in the vicinity. Similarly, devices communicating with a macrocell base station can interfere with nearby femtocell access points.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with reducing uplink interference to a femtocell access point from one or more devices communicating with a macrocell access point and/or vice versa. In one example, an inter-frequency handover (IFHO) threshold can be lowered for a device communicating with the macrocell access point when potential interference to the femtocell access point from the device is determined to exceed a threshold level. In another example, the femtocell access point can switch to a hybrid operating mode once interference from the device exceeds a threshold level to facilitate handing the device over to the femtocell access point. In another example, a data rate of the device can be limited by the macrocell access point when interference from the device to the femtocell access point exceeds a threshold level; this can result in the device transmitting to the macrocell access point at a lower power. In yet another example, the femtocell access point can increase a downlink transmission power, such that interference from the femtocell access point to the device exceeds the IFHO threshold, and causes an IFHO of the device from the macrocell access point. In another example, the femtocell access point can reduce interference to macrocell access points caused by one or more devices communicating with the femtocell access point by reducing a coverage area of the femtocell.

According to an example, a method for mitigating interference in a wireless network is provided. The method includes determining that a served device potentially interferes one or more access points and adjusting an inter-frequency handover threshold or a data rate for the served device based at least in part on the determining.

In another aspect, an apparatus for mitigating interference in a wireless network is provided. The apparatus includes at least one processor configured to determine that a served device potentially interferes one or more access points. The at least one processor is further configured to adjust an inter-frequency handover threshold or a data rate for the served device based at least in part on the determining. The apparatus also includes a memory coupled to the at least one processor.

In yet another aspect, an apparatus for mitigating interference in a wireless network is provided that includes means for determining that a served device potentially interferes one or more access points. The apparatus further includes means for adjusting an inter-frequency handover threshold or a data rate for the served device based at least in part on the means for determining determining that the served device potentially interferes the one or more access points.

Still, in another aspect, a computer-program product for mitigating interference in a wireless network is provided including a computer-readable medium having code for causing at least one computer to determine that a served device potentially interferes one or more access points. The computer-readable medium further includes code for causing the at least one computer to adjust an inter-frequency handover threshold or a data rate for the served device based at least in part on the determining.

Moreover, in an aspect, an apparatus for mitigating interference in a wireless network is provided that includes an interference determining component for determining that a served device potentially interferes one or more access points. The apparatus further includes a component for adjusting an inter-frequency handover threshold or a data rate for the served device based at least in part on the interference determining component determining that the served device potentially interferes the one or more access points.

According to another example, a method for mitigating interference in a wireless network is provided including operating in a closed access mode allowing communications with member devices and detecting interference from one or more non-member devices served by one or more access points. The method further includes switching to a hybrid or open access mode to allow communications with the one or more non-member devices based on the detected interference In another aspect, an apparatus for mitigating interference in a wireless network is provided. The apparatus includes at least one processor configured to advertise a closed access mode allowing communications with member devices and detect interference from one or more non-member devices served by one or more access points. The at least one processor is further configured to switch to advertise a hybrid or open access mode to allow communications with the one or more non-member devices based on the detected interference. The apparatus also includes a memory coupled to the at least one processor.

In yet another aspect, an apparatus for mitigating interference in a wireless network is provided that includes means for operating in a closed access mode allowing communications with member devices. The apparatus further includes means for detecting interference from one or more non-member devices served by one or more access points, wherein the means for operating switches to a hybrid or open access mode to allow communications with the one or more non-member devices based on the detected interference.

Still, in another aspect, a computer-program product for mitigating interference in a wireless network is provided including a computer-readable medium having code for causing at least one computer to advertise a closed access mode allowing communications with member devices and code for causing the at least one computer to detect interference from one or more non-member devices served by one or more access points. The computer-readable medium further includes code for causing the at least one computer to switch to advertise a hybrid or open access mode to allow communications with the one or more non-member devices based on the detected interference.

Moreover, in an aspect, an apparatus for mitigating interference in a wireless network is provided that includes a pathloss receiving component for obtaining an access mode component for operating in a closed access mode allowing communications with member devices. The apparatus further includes an interference detecting component for detecting interference from one or more non-member devices served by one or more access points, wherein the access mode component switches to a hybrid or open access mode to allow communications with the one or more non-member devices based on the detected interference.

In another example, a method for mitigating interference in wireless communications is provided including detecting interference from one or more devices communicating with one or more access points and increasing a downlink transmit power according to a boosting pattern over time based on detecting the interference.

In another aspect, an apparatus for mitigating interference in wireless communications is provided. The apparatus includes at least one processor configured to detect interference from one or more devices communicating with one or more access points. The at least one processor is further configured to increase a downlink transmit power according to a boosting pattern over time based on detecting the interference. The apparatus also includes a memory coupled to the at least one processor.

In yet another aspect, an apparatus for mitigating interference in wireless communications is provided that includes means for detecting interference from one or more devices communicating with one or more access points. The apparatus further includes means for increasing a downlink transmit power according to a boosting pattern over time based on detecting the interference.

Still, in another aspect, a computer-program product for mitigating interference in wireless communications is provided including a computer-readable medium having code for causing at least one computer to detect interference from one or more devices communicating with one or more access points. The computer-readable medium further includes code for causing the at least one computer to increase a downlink transmit power according to a boosting pattern over time based on detecting the interference.

Moreover, in an aspect, an apparatus for mitigating interference in wireless communications is provided that includes an interference detecting component for detecting interference from one or more devices communicating with one or more access points. The apparatus further includes a downlink transmit component for increasing a downlink transmit power according to a boosting pattern over time based on detecting the interference.

According to another example, a method for mitigating interference in wireless communications is provided. The method includes determining that a served device potentially interferes one or more access points and adjusting a pathloss edge target based at least in part on the determining.

In another aspect, an apparatus for mitigating interference in wireless communications is provided. The apparatus includes at least one processor configured to determine that a served device potentially interferes one or more access points. The at least one processor is further configured to adjust a pathloss edge target based at least in part on the determining. The apparatus also includes a memory coupled to the at least one processor.

In yet another aspect, an apparatus for mitigating interference in wireless communications is provided that includes means for determining that a served device potentially interferes one or more access points. The apparatus further includes means for adjusting a pathloss edge target based at least in part on the means for determining determining that the served device potentially interferes.

Still, in another aspect, a computer-program product for mitigating interference in wireless communications is provided including a computer-readable medium having code for causing at least one computer to determine that a served device potentially interferes one or more access points. The computer-readable medium further includes code for causing the at least one computer to adjust a pathloss edge target based at least in part on the determining.

Moreover, in an aspect, an apparatus for mitigating interference in wireless communications is provided that includes an interference determining component for determining that a served device potentially interferes one or more access points. The apparatus further includes a pathloss edge target adjusting component for adjusting a pathloss edge target based at least in part on the interference determining component determining that the served device potentially interferes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
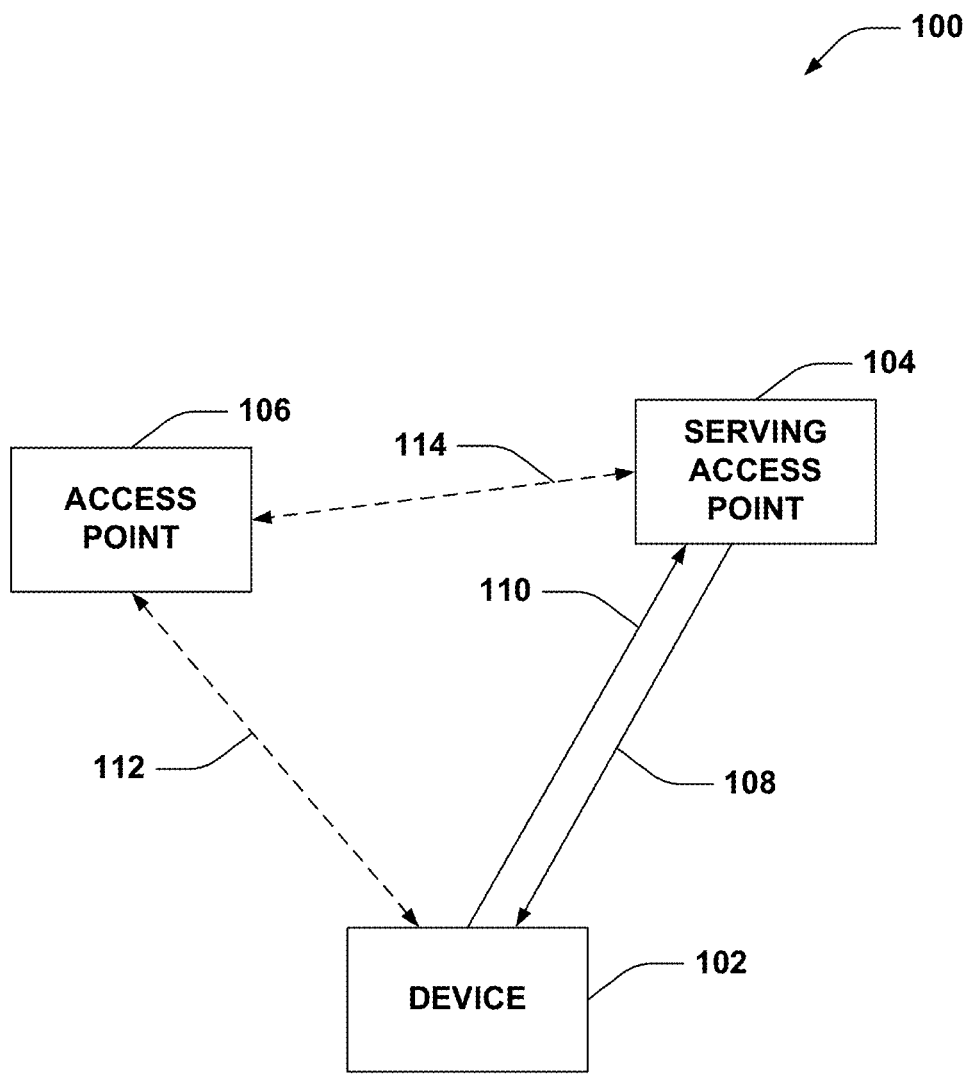
FIG. 1 is a block diagram of an example system that facilitates mitigating interference in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, interference in femtocell deployments caused by devices communicating with one or more access points can be mitigated. For example, inter-frequency handover (IFHO) can be triggered for a device communicating with a macrocell access point and causing at least a threshold level of interference to a femtocell access point. In another example, a femtocell access point can switch to operate in a hybrid access mode to serve one or more devices interfering with the femtocell access point. Moreover, for example, a macrocell access point can limit a data rate of a device communicating therewith to lower transmit power of the device and thus mitigate interference to one or more other access points. In yet another example, a femtocell access point can increase downlink transmission power to cause interference to a device communicating with a macrocell access point to initiate IFHO for the device. Furthermore, to mitigate interference to a macrocell access point, caused by devices communicating with a femtocell access point, the femtocell access point can reduce a coverage area.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 with possible access point interference is illustrated. System 100 comprises a device 102 that can communicate with a serving access point 104 to receive access to a wireless network and/or one or more components thereof. System 100 can also comprise another access point 106 with which device 102 can potentially interfere. Device 102 can be a UE, a modem (or other tethered device), a portion thereof, and/or the like. Access points 104 and/or 106 can each be a macrocell access point, femtocell access point (such as a Home Node B or Home evolved Node B, collectively referred to herein as H(e)NB), picocell access point, microcell access point, a mobile base station, a relay node, a device (e.g., communicating in peer-to-peer or ad-hoc mode), a portion thereof, and/or the like.

According to an example, serving access point 104 can transmit signals to device 102 to communicate therewith, and device 102 can potentially interfere with access point 106 while transmitting signals 110 to serving access point 104 (e.g., where device 102 is within a threshold geographic range of access point 106). Described herein are various enhancements to mitigate such interference 112. In one example, serving access point 104 can be a macrocell access point, or another access point with planned deployment, and access point 106 can be a femtocell, picocell, microcell, etc. access point with unplanned deployment. Interference 112 from device 102 to access point 106 can result at least in part to the unplanned deployment of access point 106.

In one example, as device 102 moves within a threshold distance of access point 106 and/or causes a threshold level of interference thereto, serving access point 104 can lower a IFHO handover threshold related to the device 102 to facilitate IFHO of the device 102. In this example, device 102 can notify serving access point 104 of one or more parameters regarding access point 106, from which serving access point 104 can discern whether to modify the IFHO threshold for the device. When the device 102 is handed over to another frequency, for example, device 102 can likely cease from interfering with communications of access point 106, as device 102 will accordingly communicate over a different frequency.

In another example, access point 106 can detect interference over a threshold level from device 102, and can switch to a hybrid or open access mode (e.g., from a closed access mode) to allow devices interfering with access point 106, such as device 102, to handover to access point 106. In this example, access point 106 can detect interference based at least in part on a measured noise level, decoding communications from device 102 (e.g., and determining device 102 is not a served device), etc. In yet another example, serving access point 104 can notify access point 106 of possible interference from device 102 (e.g., by initiating a backhaul link 114 to access point 106 based on receiving one or more parameters regarding access point 106 from device 102). Thus, upon switching to hybrid or open access mode, device 102 can be handed over from serving access point 104 to access point 106.

Moreover, in an example, upon determining that device 102 may cause a threshold level of interference to access point 106, serving access point 104 can limit a data rate for device 102 communications with serving access point 104. For example, serving access point 104 can lower a number of resources assigned to device 102. In any case, serving access point 104 can lower the data rate based additionally or alternatively in part on observing strength and/or quality of pilot signals from serving access point 104 at device 102. Also, in an example, access point 106 can detect interference from one or more devices, which can be based on detecting a rise-over-thermal (RoT) over a threshold level, an uplink received signal strength indication (RSSI) over a threshold level, an indication of possible interference received from serving access point 104, etc., and can accordingly boost transmission power of access point 106 to possibly cause IFHO of the device (e.g., device 102). In this example, device 102 reports the interference or noise level to serving access point 104, and serving access point can trigger the IFHO to an access point in another frequency based on the interference or noise level exceeding the IFHO threshold.

In another example, serving access point 104 can be a femtocell access point, and device 102 communicating with serving access point 104 can cause interference to a macrocell access point 106. In this example, serving access point 104 can determine a pathloss edge target not only based on a downlink coverage requirement and downlink transmission power limitation, but also on the uplink performance and interference of device 102 and/or other devices served by serving access point 104. Thus, for example, where serving access point 104 is notified of or otherwise determines interference caused to access point 106, serving access point 104 can decrease a pathloss edge target, which can modify a coverage area of serving access point 104 and cause device 102 to handover to access point 106 or one or more other access points.

Figure 2:
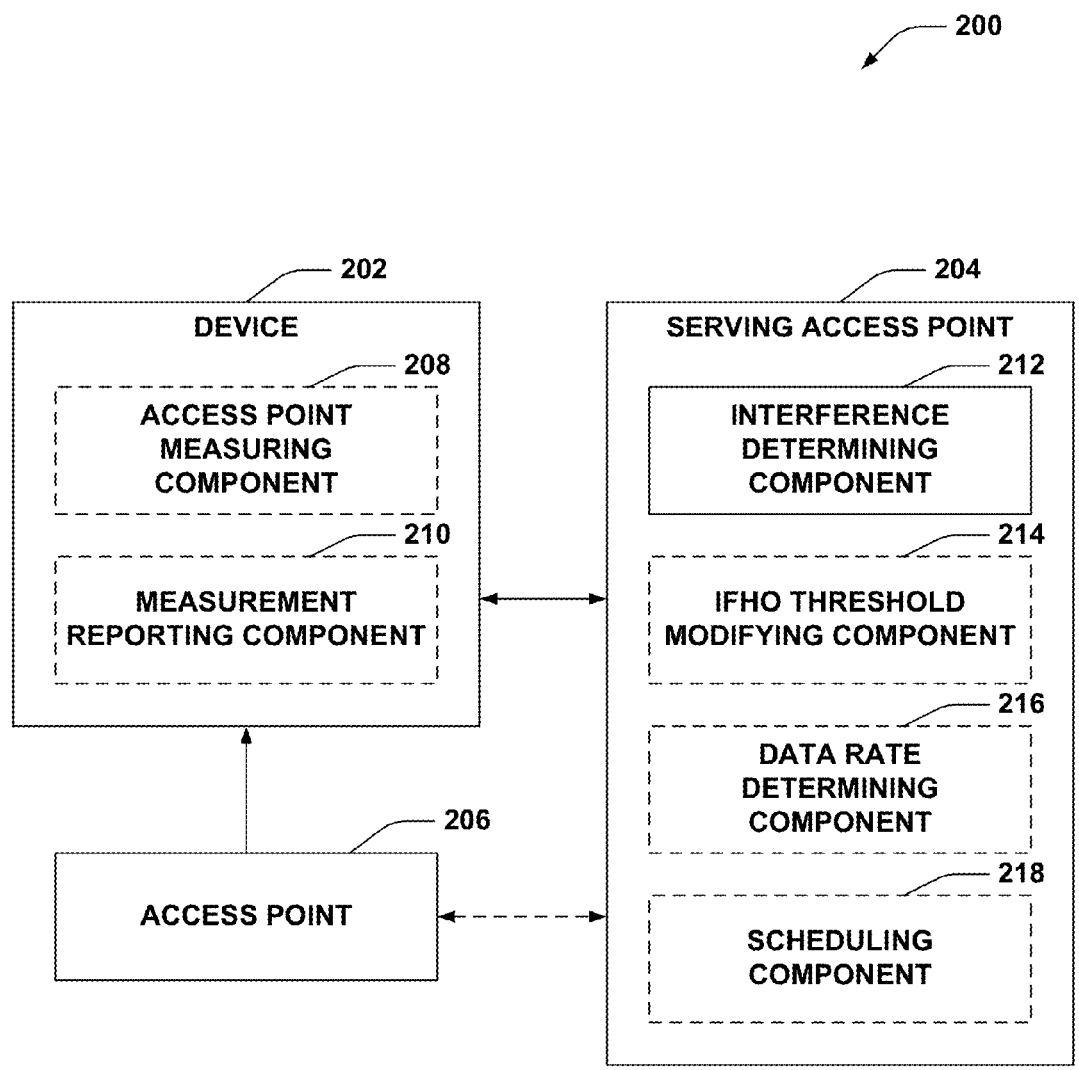
FIG. 2 is a block diagram of an example system for mitigating interference caused by one or more served devices.

Turning to FIG. 2, an example wireless communication system 200 is illustrated for mitigating interference caused by devices communicating with an access point. System 200 comprises a device 202 that communicates with a serving access point 204 to receive wireless network access, as described. In addition, system 200 can include another access point 206 with which device 202 can potentially interfere due at least in part to communicating with serving access point 204. For example, deployment of serving access point 204 can result in interference to other access points in the vicinity of serving access point 204 (not shown), whether caused by serving access point 204, device 202 or other devices communicating with serving access point 204, etc. As described, for example, device 202 can be a UE, modem, etc., and serving access point 204 and access point 206 can each be a macrocell, femtocell, picocell, or similar access point, an H(e)NB, a mobile base station, a device (e.g., communicating in peer-to-peer or ad-hoc mode), a portion thereof, and/or the like.

Device 202 can optionally comprise an access point measuring component 208 for receiving and analyzing signals from one or more access points, and/or a measurement reporting component 210 for communicating measurements of the signals to one or more access points. Serving access point 204 can comprise an interference determining component 212 for discerning a level of potential interference caused by one or more devices, and an optional IFHO threshold modifying component 214 for adjusting an IFHO threshold for the one or more devices based on the level of potential interference. Serving access point 204 also optionally comprises a data rate determining component 216 for adjusting a data rate for the one or more devices based on the level of potential interference, and/or a scheduling component 218 for modifying a resource allocation based on the adjusted data rate.

According to an example, device 202 can communicate with serving access point 204 to receive access in a wireless network, and interference determining component 212 can determine potential interference of device 202 to one or more access points. For example, the potential interference can be determine with respect to a specific access point, such as access point 206, or more generally based on parameters related to device 202. In one example, access point measuring component 208 can periodically measure signals from other access points, such as access point 206, and measurement reporting component 210 can report the measurements to serving access point 204.

For example, this can be part of a handover procedure where measurement reporting component 210 formulates the measurement report of indicated signal measurements (e.g., signal-to-noise ratio (SNR), received signal power, Ecp, over total power, Io, or other signal strength or quality measurements, etc.) to other access points such that serving access point 204 can evaluate the measurement report to determine whether to handover device 202 to one or more of the other access points (e.g., where the one or more of the other access points have signal measurements that are improved over measurements of serving access point 204 at device 202). This can be part of handover or reselection in one or more wireless communication technologies. In another example, access point measuring component 208 can measure one or more access points according to a timer or other event, based on a request from serving access point 204, and/or the like.

In an example, interference determining component 212 can determine that device 202 may potentially cause interference to one or more access points, such as access point 206. For example, this can include receiving a measurement report from device 202 and determining a measurement of a signal from access point 206 (e.g., SNR)) is over a threshold level, where the threshold level can be set to indicate interference and/or that a corresponding device is almost interfering. Thus, in this example, device 202 is within a distance of access point 206, based on signal measurement, such that device 202 may cause interference, or about to begin causing interference, thereto. In another example, interference determining component 212 can determine interference of device 202 based on receiving an indication of interference from access point 206 (e.g., over a backhaul link).

Moreover, in an example, interference determining component 212 can detect potential interference of device 202 to one or more access points in general based at least in part on a reported measurement of a signal from serving access point 204. For example, this can be reported by device 202 as channel quality indicator (CQI) or similar control information over a control channel. Thus, in this example, interference can be determined without measurement reports. Where the reported measurement of the signal (e.g., SNR) is below a threshold level, this can indicate device 202 is near another access point, which can be jamming the pilot signal from serving access point 204.

In any case, once potential interference is determined serving access point 204 can attempt to mitigate such interference to access point 206 in one or more aspects. In one example, IFHO threshold modifying component 214 can adjust an IFHO threshold for device 202 based on the potential interference to cause device 202 to perform an inter-frequency handover. As described, serving access point 204 can institute IFHO thresholds for devices to facilitate performing IFHO of the device where a measurement of serving access point 204 reported by the device 202 (e.g., SNR) is less than a threshold level (e.g., −16 decibel (dB) for a macrocell access point). The device can accordingly report the signal measurement with the measurement report, periodically based on one or more timers, based on one or more events, and/or the like.

Thus, where interference determining component 212 determines potential interference of device 202 to access point 206 (e.g., based on determining that a SNR or similar metric of access point 206 received in a measurement report, etc. is over a threshold level), IFHO threshold modifying component 214 can decrease the IFHO threshold for device 202. Where device 202 is nearing access point 206, the device's reported signal measurement to serving access point 204 can decrease as additional noise is received from access point 206. Thus, the IFHO threshold decrease can cause device 202 to perform IFHO sooner. Once the IFHO is performed, device 202 can no longer interfere with access point 206 as it is on another frequency (and/or interference can be lessened in the case where device 202 is handed over to an adjacent frequency). It is to be appreciated that IFHO threshold modifying component 214 can adjust the IFHO threshold in fixed value, according to the potential interference (e.g., determine an adjustment value based at least in part on the reported signal measurement of access point 206), etc.

In another example, upon determining potential interference of device 202 to one or more access points, such as access point 206, serving access point 204 can limit a data rate for device 202 to mitigate occurrence of interference. In this example, based on determining the interference, data rate determining component 216 can decrease a data rate for device 202, such as a maximum allowed data rate. In one example, this can include scheduling component 218 modifying a resource allocation to device 202 based on the data rate limitation. Similarly, as with the IFHO threshold, the data rate can be adjusted in fixed value, as a function of the potential interference determined, and/or the like. In addition, data rate determining component 216 can increase a data rate when the threat of interference has ceased (e.g., when a reported signal measurement of access point 206 or other access points has decreased below a threshold level, etc.).

Figure 3:
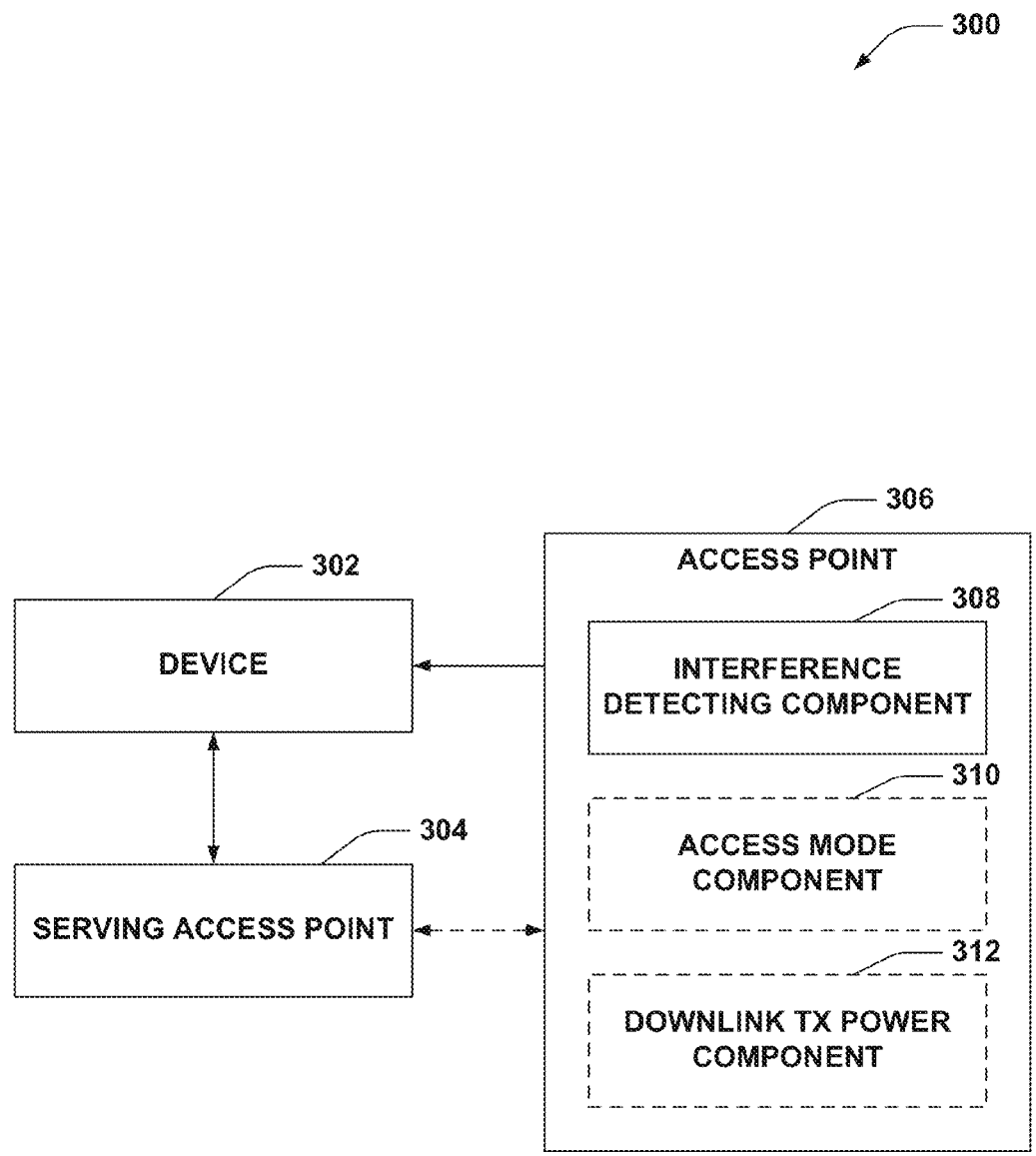
FIG. 3 is a block diagram of an example system for mitigating interference from one or more non-member devices.

Referring to FIG. 3, an example wireless communication system 300 is illustrated for mitigating interference from one or more devices communicating with another access point. System 300 comprises a device 302 that communicates with a serving access point 304 to receive access to a wireless network. System 300 also comprises an access point 306, with which device 302 can potentially interfere (which can include interfering with devices communicating with access point 306) while transmitting signals to access point 304. In this regard, for example, serving access point 304 and/or access point 306 can be deployed within a vicinity of one another. As described, device 302 can be a UE, modem, etc., and serving access point 304 and/or access point 206 can each be a macrocell, femtocell, or picocell access point, etc.

Access point 306 comprises an interference detecting component 308 for determining that one or more devices potentially interfere with communications from access point 306, an optional access mode component 310 for modifying an access point of access point 306 based on the potential interference, and/or an optional downlink transmit power component 312 for adjusting a downlink transmit power of access point 306 based on the potential interference.

According to an example, device 302 can communicate with serving access point 304 to receive wireless network access and can interfere with access point 306 when communicating with serving access point 304. For example, device 302 can be near access point 306, which can be a femtocell access point, while communicating with serving access point 304, which can be a macrocell access point. Access point 306, however, can advertise and operate in a closed access mode offering access to member devices of a closed subscriber group (CSG) or other restricted association to which device 302 is not a member. For example, interference detecting component 308 can determine interference from device 302, which is a non-member device, based at least in part on receiving signals therefrom intended for serving access point 304, receiving a notification of interference or potential interference from serving access point 304 (e.g., based on serving access point 304 determining potential interference as described with reference to FIG. 2) over a backhaul link thereto, and/or the like. In another example, interference detecting component 308 can determine the interference and/or a level thereof based on a total wideband power measurement, a RoT measurement, an out-of-cell interference measurement (e.g., measuring total power level, Ioc, over a noise level, No), and/or the like.

In one example, upon detecting interference from device 302 and/or detecting interference over a threshold level, access mode component 310 can determine to advertise a hybrid or open access mode to allow interfering non-member device 302 to communicate with access point 306. In this example, device 302 can detect signals from access point 306 that advertise the hybrid or open access mode (e.g., in system information blocks transmitted by the access point 306) and can include access point 306 in a measurement report for handover based on determining access point 306 is in hybrid or open access mode. Serving access point 304 can then receive the measurement report and handover device 302 to access point 306 upon determining radio conditions reported for access point 306 are improved over those of serving access point 304. Thus, device 302 can communicate with access point 306 instead of interfering therewith. In addition, once device 302 is handed over to another access point from access point 306, or communications with device 302 at access point 306 have otherwise ended, access mode component 310 can switch back to closed access mode, in one example.

In another example, downlink transmit power component 312 can modify a downlink transmit power of access point 306 based on the interference and/or a level of interference detected. By increasing or boosting downlink transmission power of access point 306, for example, device 302 can report a lower signal to interference ratio to serving access point 304 since the interference caused by access point 306 to device 302 has been increased. Thus, as described above, this can cause serving access point 304 to initiate IFHO of the device 302 where the ratio is below a threshold level, in which case device 302 can no longer interfere with access point 306.

For example, downlink transmit power component 312 can boost downlink transmit power according to a power boosting pattern. The power boosts can be grouped into one or more clusters of N bursts, where N is a positive integer, and each burst can have an associated time duration. For each burst, downlink transmit power component 312 can increment the downlink transmit power. For example, once downlink transmit power component 312 reaches N bursts, downlink transmit power component 312 can cease boosting downlink transmit power for another time duration to prevent causing interference to one or more neighboring access points. Moreover, for example, downlink transmit power component 312 can boost downlink transmit power of a control channel for device 302, a data channel, and/or the like. In addition, the time durations and power boost values can be selected so as to mitigate bursty interference caused to other devices communicating with other access points. Once interference is no longer detected from the device 302 (e.g., device 302 performed IFHO and now operates on a different frequency), downlink transmit power component 312 can return to an original downlink transmit power.

Figure 4:
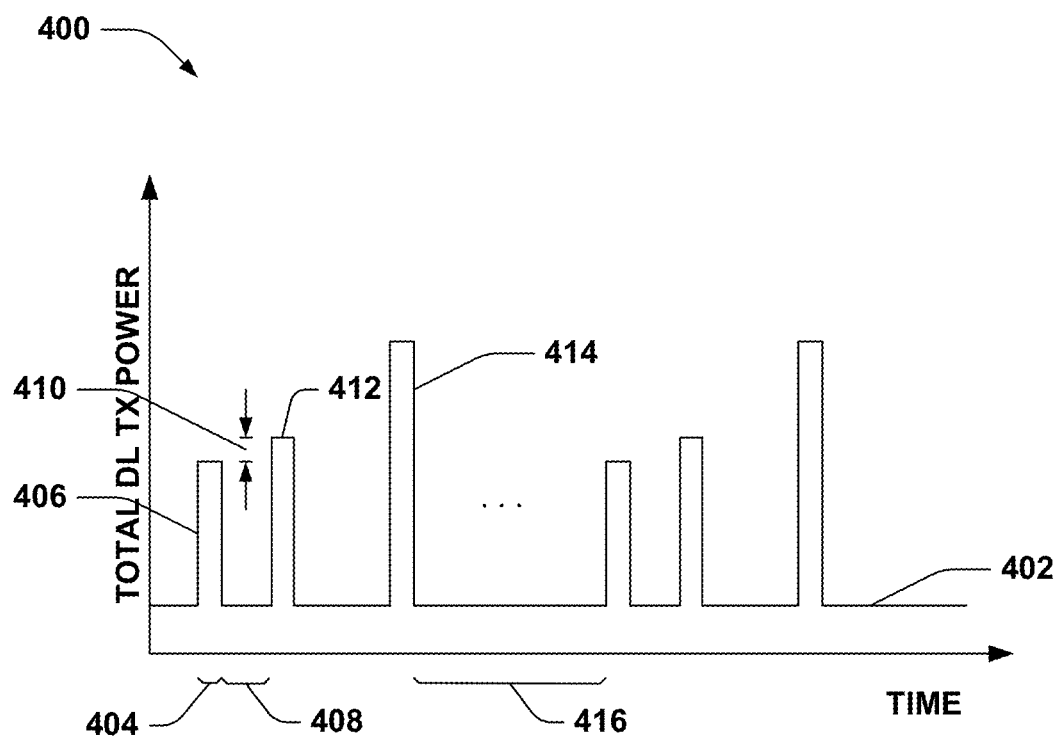
FIG. 4 is an example downlink transmit power boosting pattern to cause one or more interfering devices to perform handover.

FIG. 4 illustrates an example downlink transmit power boost pattern graph 400 showing total downlink transmit power over time. As described, the downlink transmit power can be boosted for an access point upon detecting interference in an attempt to cause IFHO to be performed for an interfering device based on the device determining a higher noise level based on the boosted downlink transmit power. An original power level for the access point can be at 402. Upon detecting interference from one or more devices, as described above, the downlink transmit power can be boosted for time duration 404 to level 406. As described, boosting the downlink transmit power in this regard can cause an interfering device to report additional noise to a serving base station, which can cause IFHO for the device. The access point can lower the downlink transmit power to original level 402 for a time duration 408. If however, the device is still interfering after a time duration 408, access point can boost the downlink transmit power by a difference of 410 to level 412 in an attempt cause IFHO for the interfering device, and so on until a last burst 414 in the cluster of bursts. Subsequently, the device can return to original power level 402 for an extended time duration 416 to prevent causing downlink interference to neighboring cell devices. Then, if interference is still present after time duration 416, another cluster of downlink transmit power boosts (or portion thereof) can occur until interference subsides, as described above.

Figure 5:
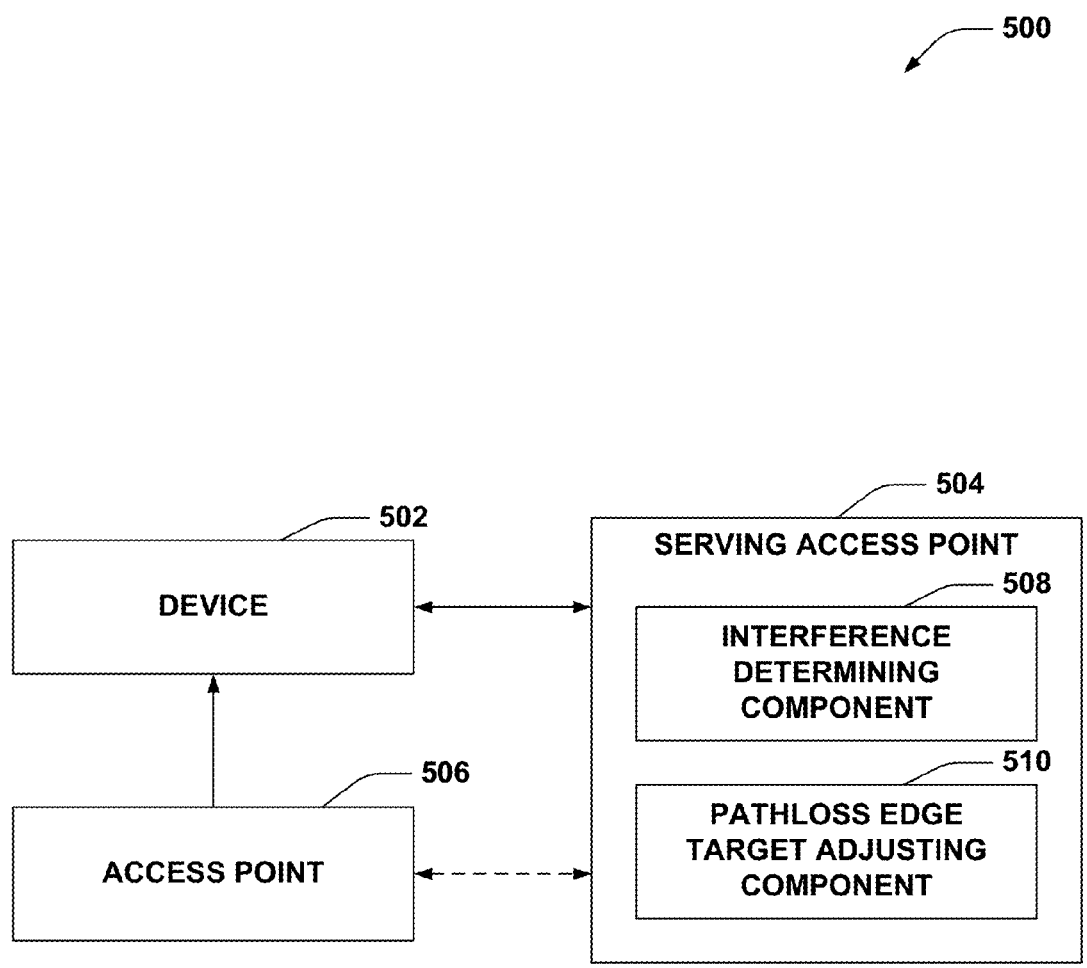
FIG. 5 is a block diagram of an example system for modifying a coverage area to mitigate interference in a wireless network.

Referring to FIG. 5, an example wireless communication system 500 is illustrated for preventing devices from interfering with one or more access points. System 500 comprises a device 502 that communicates with a serving access point 504 to receive access to a wireless network. As described, for example, device 502 can potentially interfere with access point 506 while transmitting signals to serving access point 504 (which can include interfering with devices communicating with access point 506) and/or vice versa. In this regard, for example, access points 504 and/or 506 can be deployed within a vicinity of one another. As described, device 502 can be a UE, modem, etc., access points 504 and/or 506 can each be a macrocell, femtocell, or picocell access point, etc.

Serving access point 504 can comprise an interference determining component 508 for determining that one or more devices may cause or are causing interference to one or more other access points, and a pathloss edge target adjusting component 510 for modifying a pathloss edge target of serving access point 504 to mitigate the interference. A pathloss edge target can relate to a desired pathloss experienced at the edge of coverage of serving access point 504. Thus, adjusting the pathloss edge target can effectively adjust a coverage of the serving access point 504. For example, a transmission power for the serving access point 504 can be computed from the pathloss edge target to achieve the target pathloss at the edge as reported by one or more devices communicating with the serving access point 504.

According to an example, device 502 can cause interference to access point 506 when transmitting signals to serving access point 504, as described. For example, interference determining component 508 can determine the interference, as described above, based on measurements of access point 506 received from device 502 (e.g., in a measurement report for handover), a determined SNR at device 502 of pilot transmission by serving access point 504, and/or the like. In addition, as described, access point 506 can notify serving access point 504 of interference from device 502 over a backhaul link.

Upon interference determining component 508 determining interference caused by one or more devices, such as device 502, to one or more access points, such as access point 506, pathloss edge target adjusting component 510 can modify a pathloss edge target to reduce a coverage area of the serving access point 504. In one example, pathloss edge target adjusting component 510 can modify the pathloss edge target upon initialization of serving access point 504 based further in part on a downlink coverage requirement and downlink transmit power limitation. For example, the pathloss edge target can be reduced as a function of a level of the determined interference, as described, shrinking the coverage area of serving access point 504. This may cause device 502, which would otherwise communicate with serving access point 504, to communicate with another access point, which may accordingly mitigate interference to access point 506.

Referring to FIGS. 6-9, example methodologies relating to mitigating interference in wireless communications are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 6:
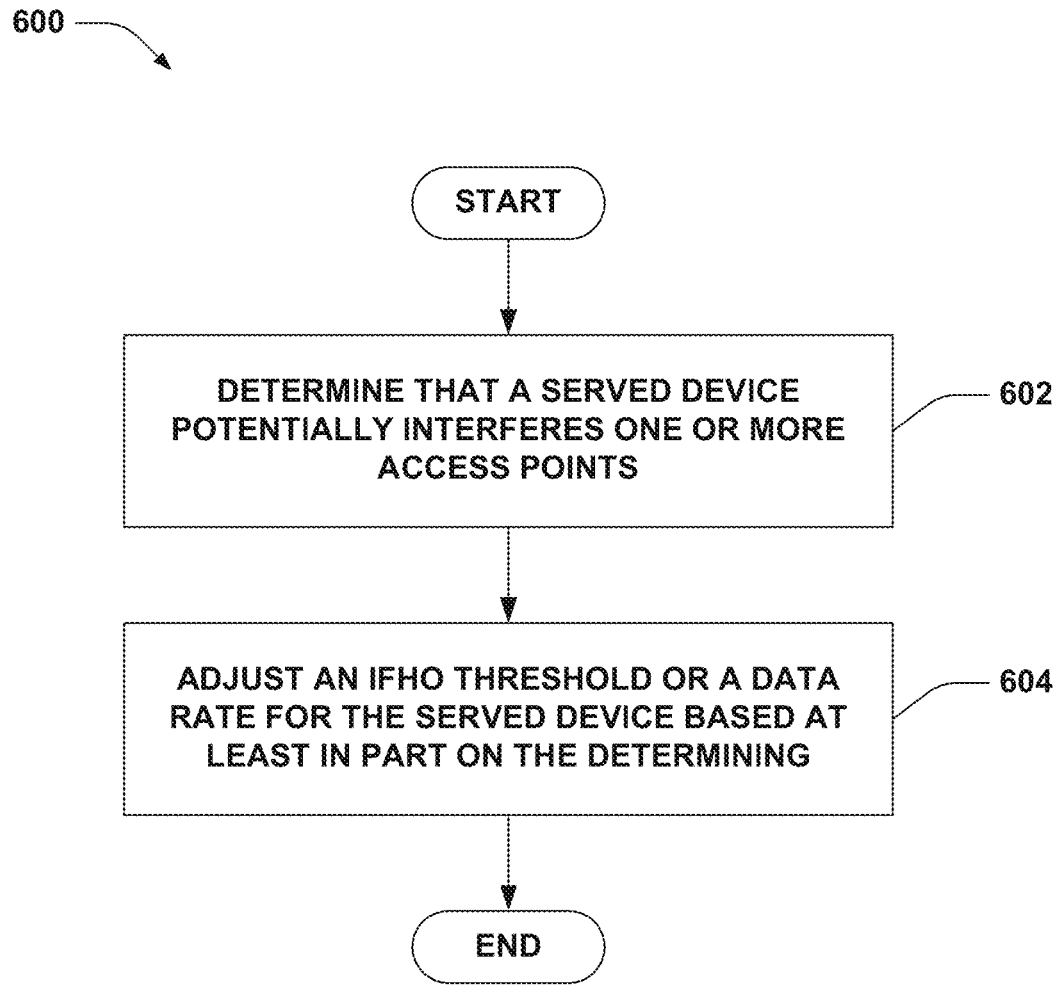
FIG. 6 is a flow chart of an aspect of an example methodology that mitigates interference from one or more served devices.

Referring to FIG. 6, an example methodology 600 is illustrated for mitigating interference in a wireless network. At 602, it can be determined that a served device potentially interferes one or more access points. As described, this can be determined based at least in part on measurements of the one or more access points from the served device, a pilot SNR measurement reported by the device, a received indication of interference from the one or more access points over a backhaul connection, and/or the like. At 604, an IFHO threshold or data rate can be adjusted for the served device based at least in part on the determining Thus, for example, decreasing the IFHO threshold can likely cause the device to perform IFHO to mitigate further interference from the device. Modifying the data rate can mitigate the occurrence of interference from the device by lowering a resource allocation thereto.

Figure 7:
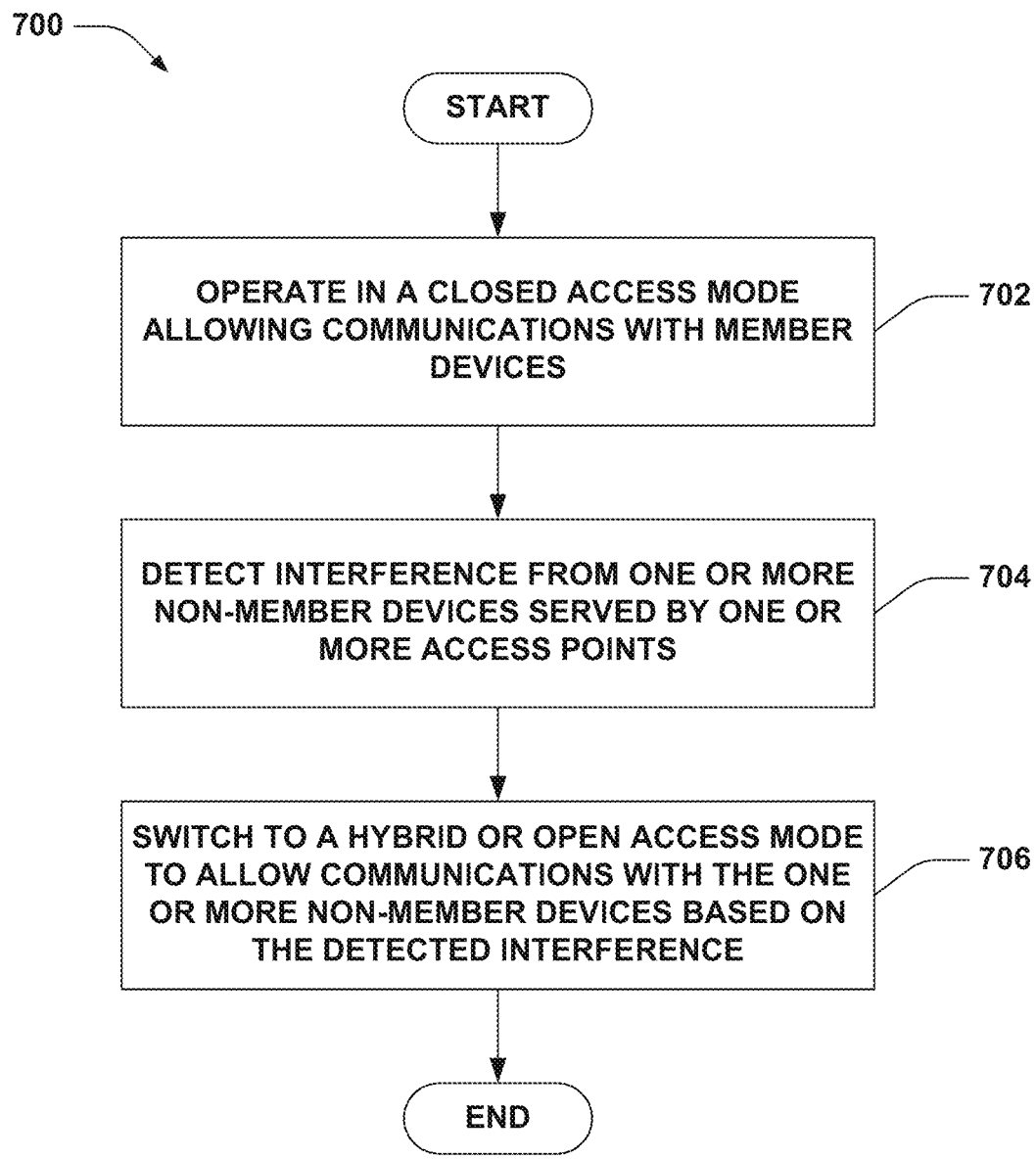
FIG. 7 is a flow chart of an aspect of an example methodology that mitigates interference by switching access modes.

Turning to FIG. 7, an example methodology 700 is displayed that switches an access mode to mitigate interference. At 702, a closed access mode can be operated allowing communications with member devices. For example, the closed access mode can provide restricted access to devices in a CSG. At 704, interference can be detected from one or more non-member devices served by one or more access points. For example, the interference can be detected by receiving signals from the one or more non-member devices intended for the one or more access points. In another example, the one or more access points can inform of the interference. At 706, a hybrid or open access mode can be switched to allow communications with the one or more non-member devices based on the detected interference.

Thus, the interference can be mitigated by allowing the devices to be handed over from the one or more access points.

Figure 8:
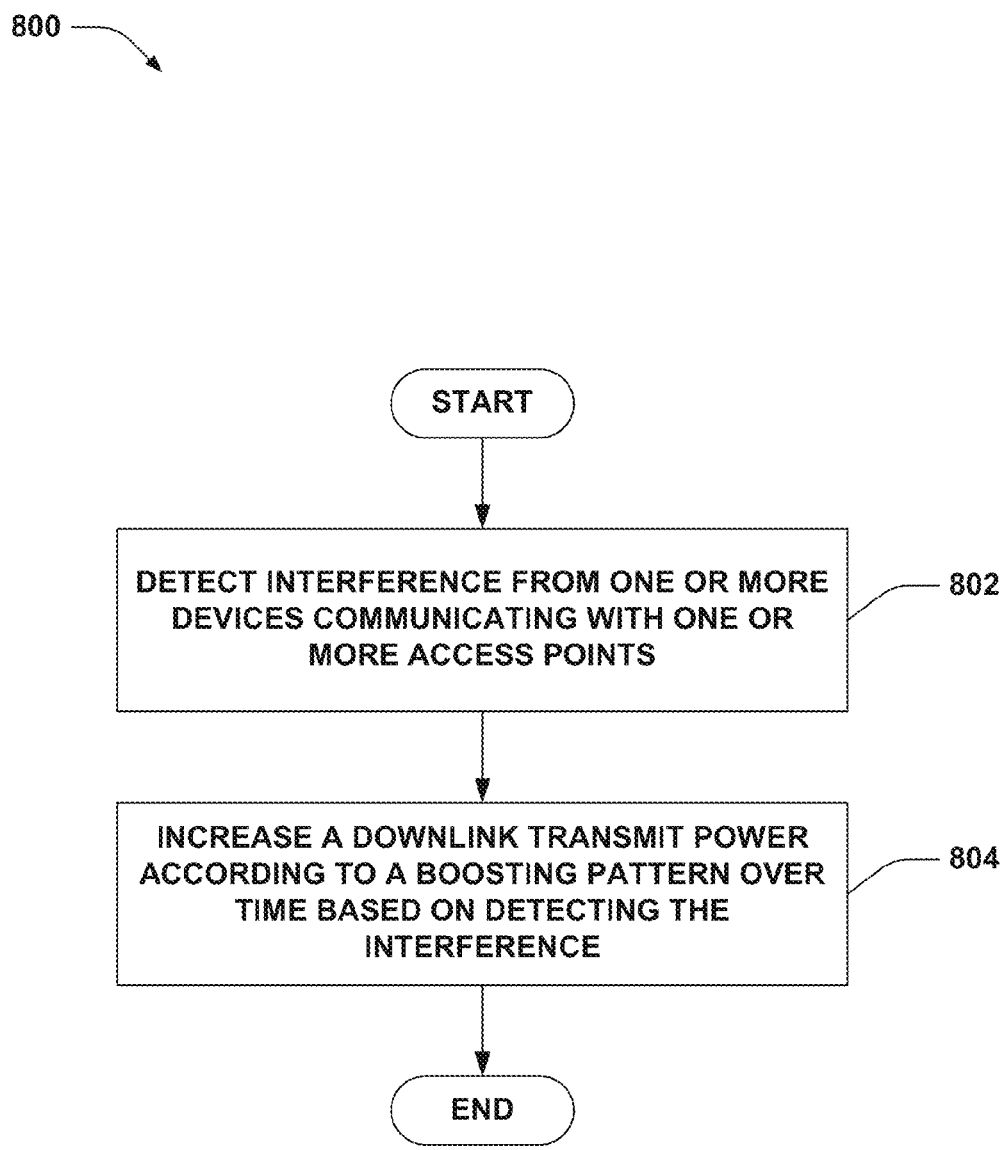
FIG. 8 is a flow chart of an aspect of an example methodology for boosting a downlink transmit power to mitigate interference.

Referring to FIG. 8, an example methodology 800 for boosting a transmit power to mitigate interference from one or more devices is illustrated. At 802, interference from one or more devices communicating with one or more access points can be detected. For example, the interference can be detected based at least in part on measurements received from the one or more devices, a reported pilot SNR from the one or more devices, received as an indication of interference over a backhaul connection with the one or more access points, and/or the like. At 804, a downlink transmit power can be increased according to a boosting pattern over time based on detecting the interference. As described, the boosting pattern can be a predefined or hardcoded, configured, etc. pattern that escalates boosting power over one or more boost clusters until interference is no longer detected from the one or more devices.

Figure 9:
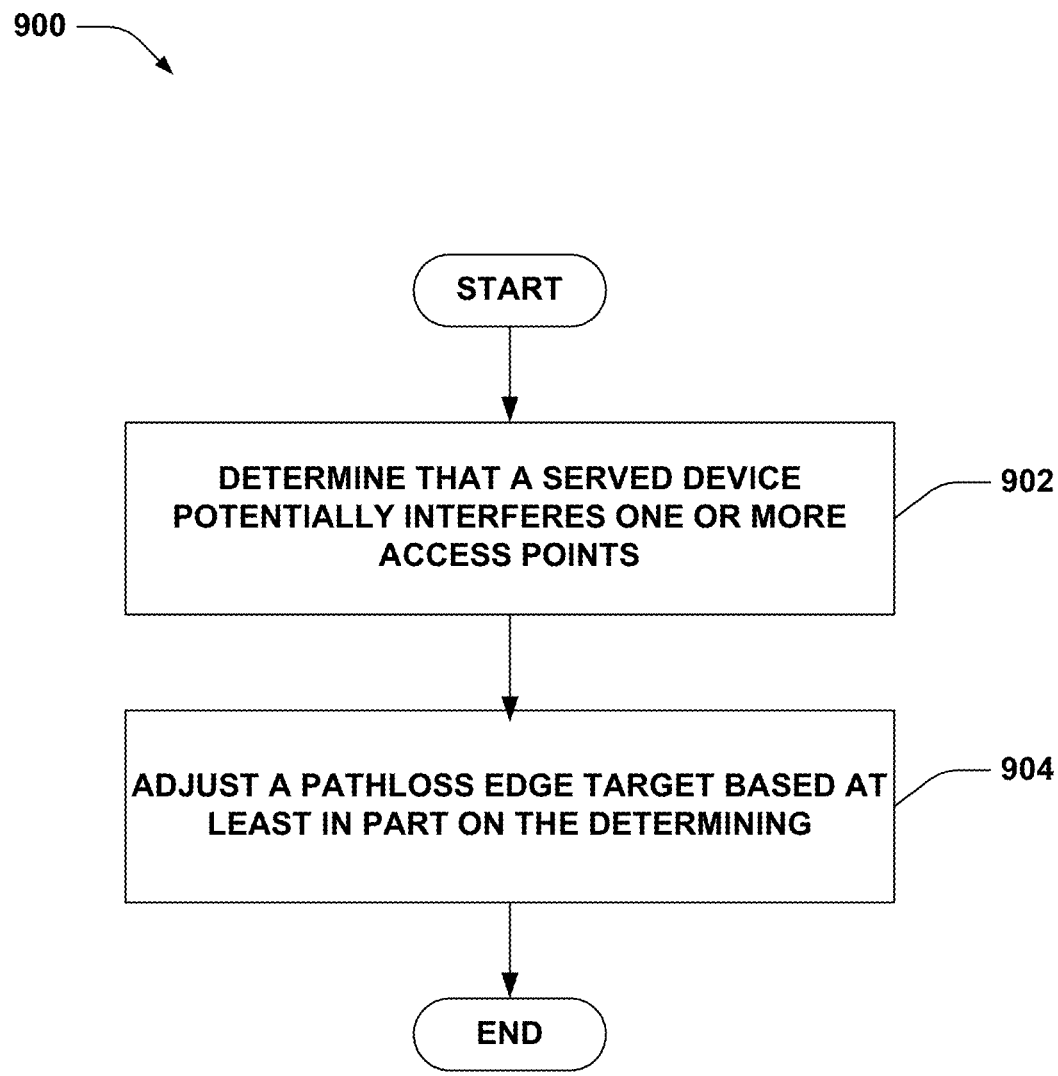
FIG. 9 is a flow chart of an aspect of an example methodology that modifies a coverage area to mitigate device interference to other access points.

Turning to FIG. 9, an example methodology 900 is depicted for modifying a coverage area based on determining potential interference. At 902, it can be determined that a served device potentially interferes one or more access points. For example, as described, this can be determined based at least in part on measurements of the one or more access points from the served device, an indication of interference received from the one or more access points, and/or the like. At 904, a pathloss edge target can be adjusted based at least in part on the determining Thus, a coverage area can become smaller based on adjusting the pathloss edge target. For example, this can be performed at initialization, and thus potential interference is mitigated based on the smaller coverage area, since potentially interfering devices can connect to the one or more access points instead.

It will be appreciated that, in accordance with one or more aspects described herein, inferences can be made regarding determining or detecting interference, determining a IFHO threshold adjustment, whether to switch an access mode, a downlink transmit power boost, a pathloss edge target, etc., and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
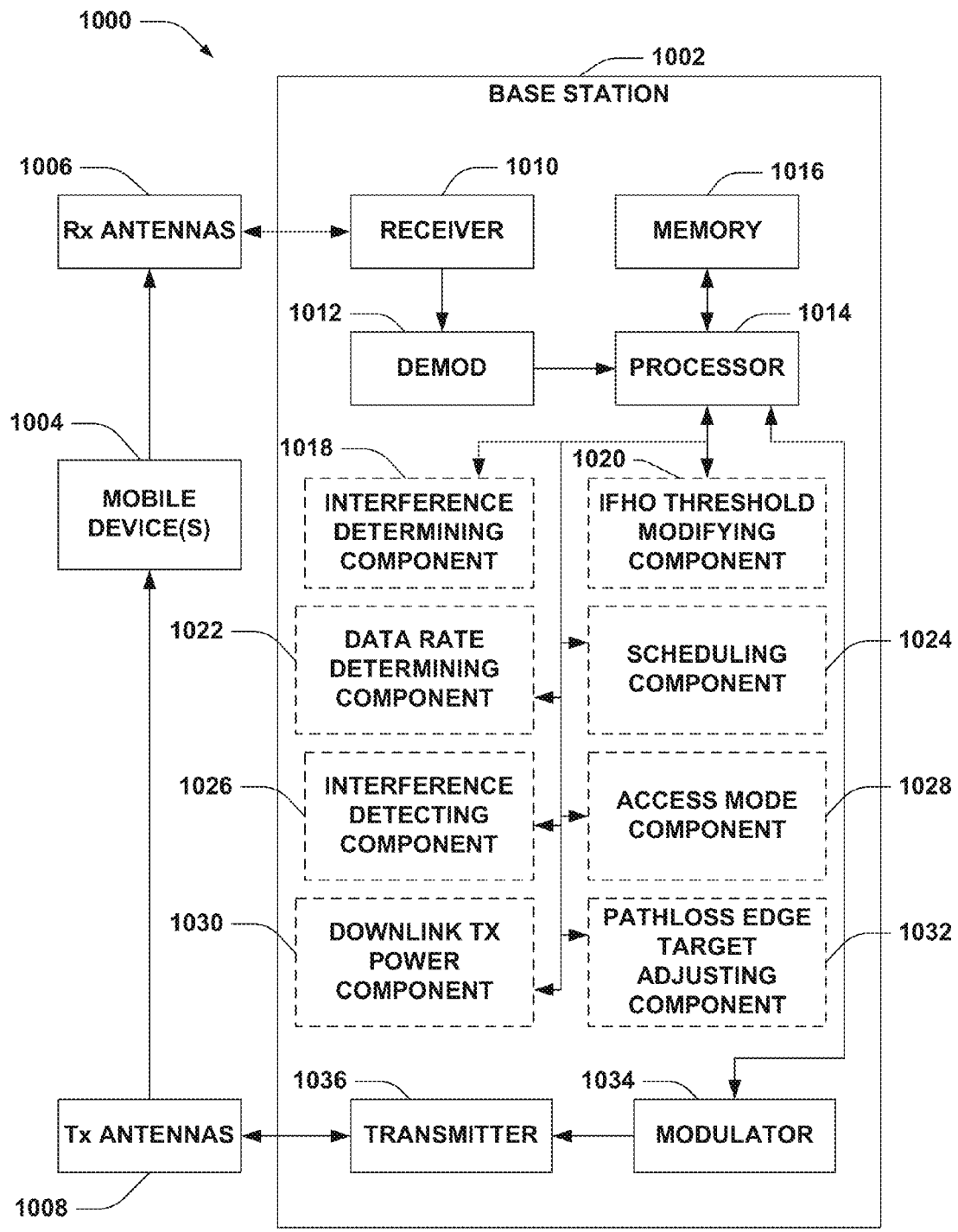
FIG. 10 is a block diagram of an example system for mitigating interference caused by one or more devices.

FIG. 10 is an illustration of a system 1000 that facilitates communicating with one or more devices using wireless communications. System 1000 comprises a base station 1002, which can be substantially any base station (e.g., a small base station, such as a femtocell, picocell, etc., mobile base station . . . ), a relay, etc., having a receiver 1010 that receives signal(s) from one or more mobile devices 1004 through a plurality of receive antennas 1006 (e.g., which can be of multiple network technologies, as described), and a transmitter 1036 that transmits to the one or more mobile devices 1004 through a plurality of transmit antennas 1008 (e.g., which can be of multiple network technologies, as described). In addition, in one example, transmitter 1036 can transmit to the mobile devices 1004 over a wired front link. Receiver 1010 can receive information from one or more receive antennas 1006 and is operatively associated with a demodulator 1012 that demodulates received information. In addition, in an example, receiver 1010 can receive from a wired backhaul link. Demodulated symbols are analyzed by a processor 1014. For example, processor 1014 can be a processor dedicated to analyzing information received by receiver 1010 and/or generating information for transmission by a transmitter 1008, a processor that controls one or more components of base station 1002, and/or a processor that both analyzes information received by receiver 1010, generates information for transmission by transmitter 1008, and controls one or more components of base station 1002, etc.

In addition, processor 1010 can be coupled to a memory 1016 that stores information related to estimating a signal (e.g., pilot) strength and/or interference strength, data to be transmitted to or received from mobile device(s) 1004 (or a disparate base station (not shown)), and/or any other suitable information related to performing the various actions and functions set forth herein, such as a determined interference, an IFHO threshold, a data rate, etc.

It will be appreciated that memory 1016, or other data stores described herein, can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1016 of the subject systems and methods is intended to comprise, without being limited to, these and any other suitable types of memory.

Processor 1014 is further optionally coupled to an interference determining component 1018, which can be similar to interference determining components 212 and/or 508, an IFHO threshold modifying component 1020, which can be similar to IFHO threshold modifying component 214, a data rate determining component 1022, which can be similar to data rate determining component 216, and/or a scheduling component 1024, which can be similar to scheduling component 218. Processor 1014 can further be optionally coupled to an interference detecting component 1026, which can be similar to interference detecting component 308, an access mode component 1028, which can be similar to access mode component 310, a downlink transmit power component 1030, which can be similar to downlink transmit power component 312, and/or a pathloss edge target adjusting component 1032, which can be similar to pathloss edge target adjusting component 510.

Moreover, for example, processor 1014 can modulate signals to be transmitted using modulator 1034, and transmit modulated signals using transmitter 1036. Transmitter 1036 can transmit signals to mobile devices 1004 over Tx antennas 1008. Furthermore, although depicted as being separate from the processor 1014, it is to be appreciated that the interference determining component 1018, IFHO threshold modifying component 1020, data rate determining component 1022, scheduling component 1024, interference detecting component 1026, access mode component 1028, downlink transmit power component 1030, pathloss edge target adjusting component 1032, demodulator 1012, and/or modulator 1034 can be part of the processor 1014 or multiple processors (not shown), and/or stored as instructions in memory 1016 for execution by processor 1014.

Figure 11:
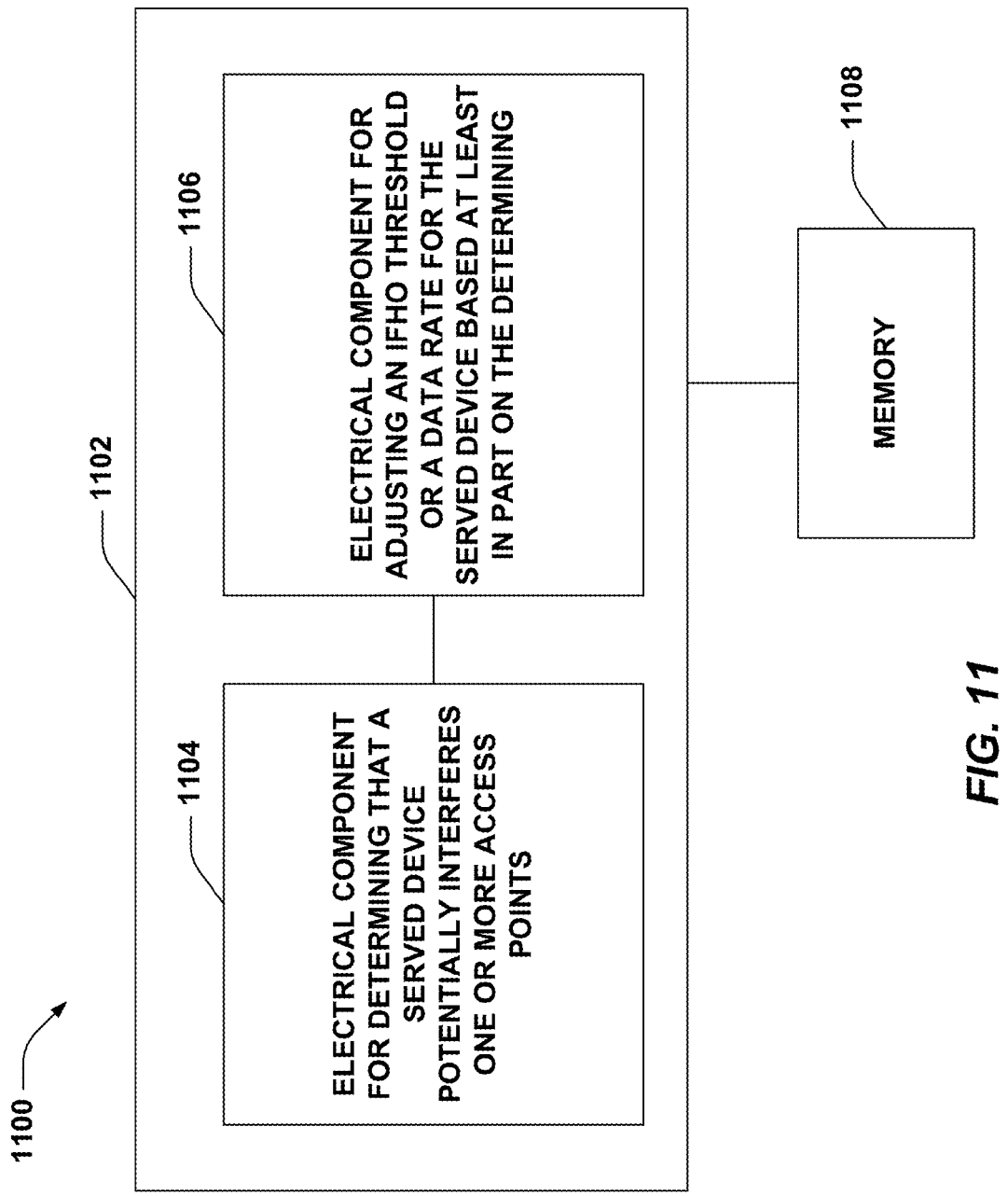
FIG. 11 is a block diagram of an example system that causes one or more interfering devices to perform handover.

With reference to FIG. 11, illustrated is a system 1100 that mitigates interference caused by one or more served devices. For example, system 1100 can reside at least partially within an access point, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining that a served device potentially interferes one or more access points 1104. As described, for example, this can be determined based on received measurements of the one or more access points from the served device, a determined pilot SNR reported by the served device, an indication from the one or more access points, etc.

Further, logical grouping 1102 can comprise an electrical component for adjusting an IFHO threshold or a data rate for the served device based at least in part on the determining 1106. Thus, as described for example, based on the determined interference of the served device, the IFHO threshold can be lowered to facilitate handing over the served device in another frequency once the served device experiences the lower threshold level of interference from the one or more access points, and/or a data rate for the served device can be lowered to facilitate lessening transmission opportunities for the served device. For example, electrical component 1104 can include an interference determining component 212, as described above. In addition, for example, electrical component 1106, in an aspect, can include an IFHO threshold modifying component 214 and/or a data rate determining component 216, as described above.

Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108. In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
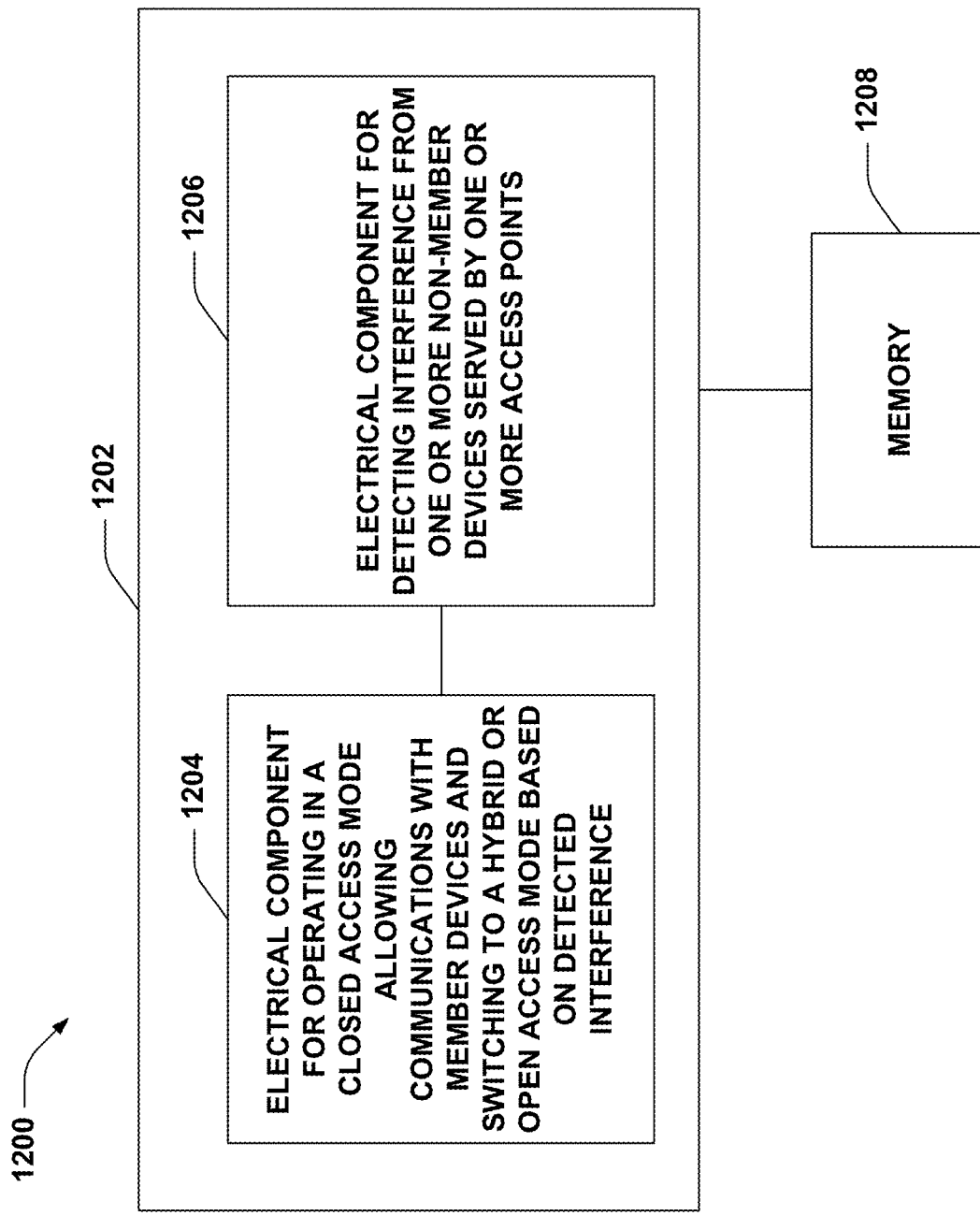
FIG. 12 is a block diagram of an example system that mitigates interference by switching access modes.

With reference to FIG. 12, illustrated is a system 1200 that switches access modes based on detecting interference from one or more devices. For example, system 1200 can reside at least partially within an access point, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for operating in a closed access mode allowing communications with member devices and switching to a hybrid or open access mode based on detected interference 1204. As described, for example, this can allow interfering devices to connect to system 1200 mitigating interference thereto.

Further, logical grouping 1202 can comprise an electrical component for detecting interference from one or more non-member devices served by one or more access points 1206. As described for example, detecting interference can be based at least in part on observing signals received from the one or more non-member devices intended for the one or more access points, receiving an indication of potential interference from the one or more access points, and/or the like. For example, electrical component 1204 can include an interference detecting component 308, as described above. In addition, for example, electrical component 1206, in an aspect, can include an access mode component 310, as described above.

Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208. In one example, electrical components 1204 and 1206 can comprise at least one processor, or each electrical component 1204 and 1206 can be a corresponding module of at least one processor. Moreover, in an additional or alternative example, electrical components 1204 and 1206 can be a computer program product comprising a computer readable medium, where each electrical component 1204 and 1206 can be corresponding code.

Figure 13:
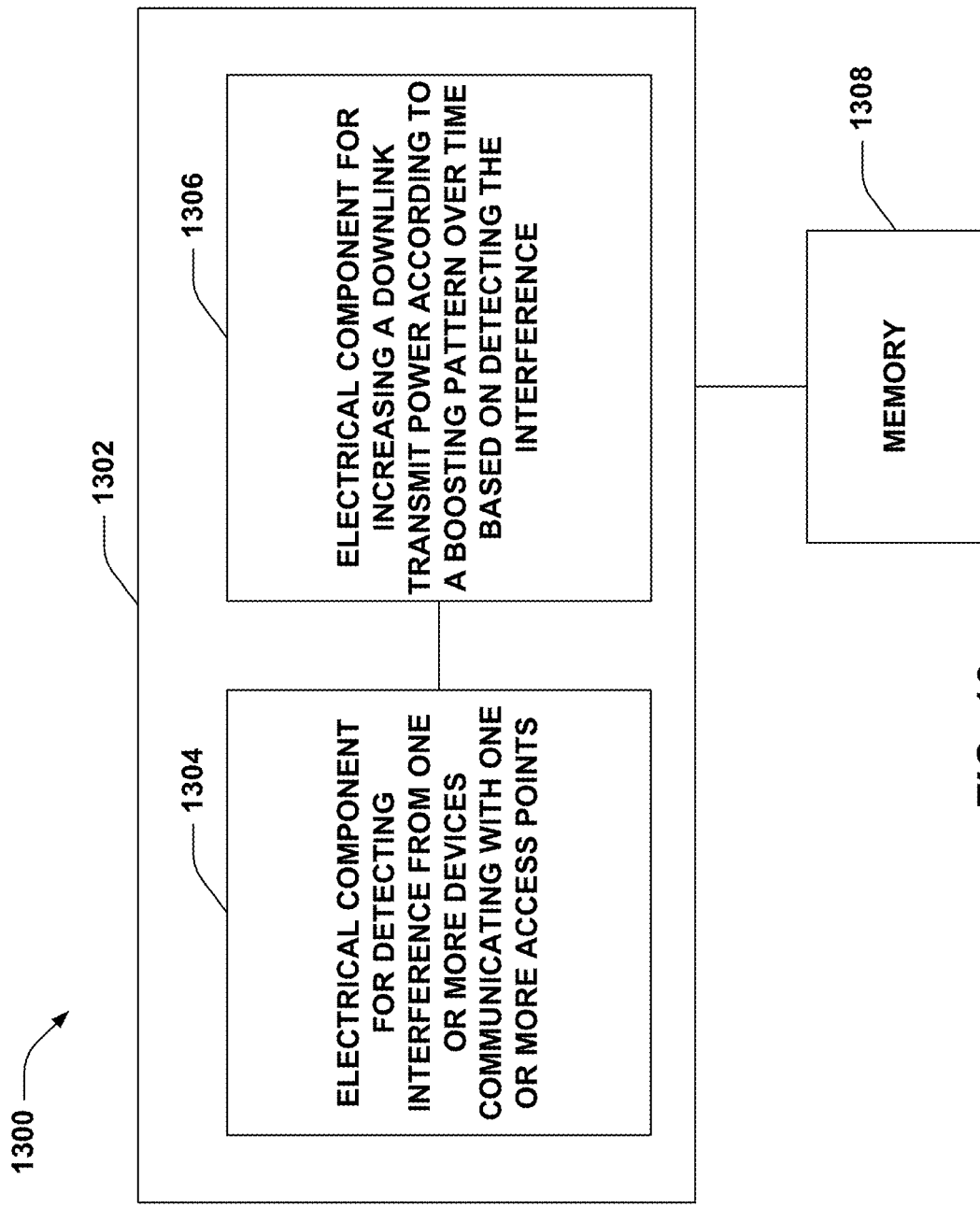
FIG. 13 is a block diagram of an example system that boosts a downlink transmit power to mitigate interference.

With reference to FIG. 13, illustrated is a system 1300 for attempting to cause IFHO handover for an interfering device. For example, system 1300 can reside at least partially within an access point, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for detecting interference from one or more devices communicating with one or more access points 1304. As described for example, detecting interference can be based at least in part on observing signals received from the one or more non-member devices intended for the one or more access points, receiving an indication of potential interference from the one or more access points, and/or the like.

Further, logical grouping 1302 can comprise an electrical component for increasing a downlink transmit power according to a boosting pattern over time based on detecting the interference 1306. Thus, as described for example, the downlink transmit power is boosted by one or more values over time intervals in one or more clusters until the interference is no longer present (e.g., until IFHO is performed for the device based on interference caused thereto by the downlink transmit power boosting). For example, electrical component 1304 can include an interference detecting component 308, as described above. In addition, for example, electrical component 1306, in an aspect, can include a downlink transmit power component 312, as described above.

Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308. In one example, electrical components 1304 and 1306 can comprise at least one processor, or each electrical component 1304 and 1306 can be a corresponding module of at least one processor. Moreover, in an additional or alternative example, electrical components 1304 and 1306 can be a computer program product comprising a computer readable medium, where each electrical component 1304 and 1306 can be corresponding code.

Figure 14:
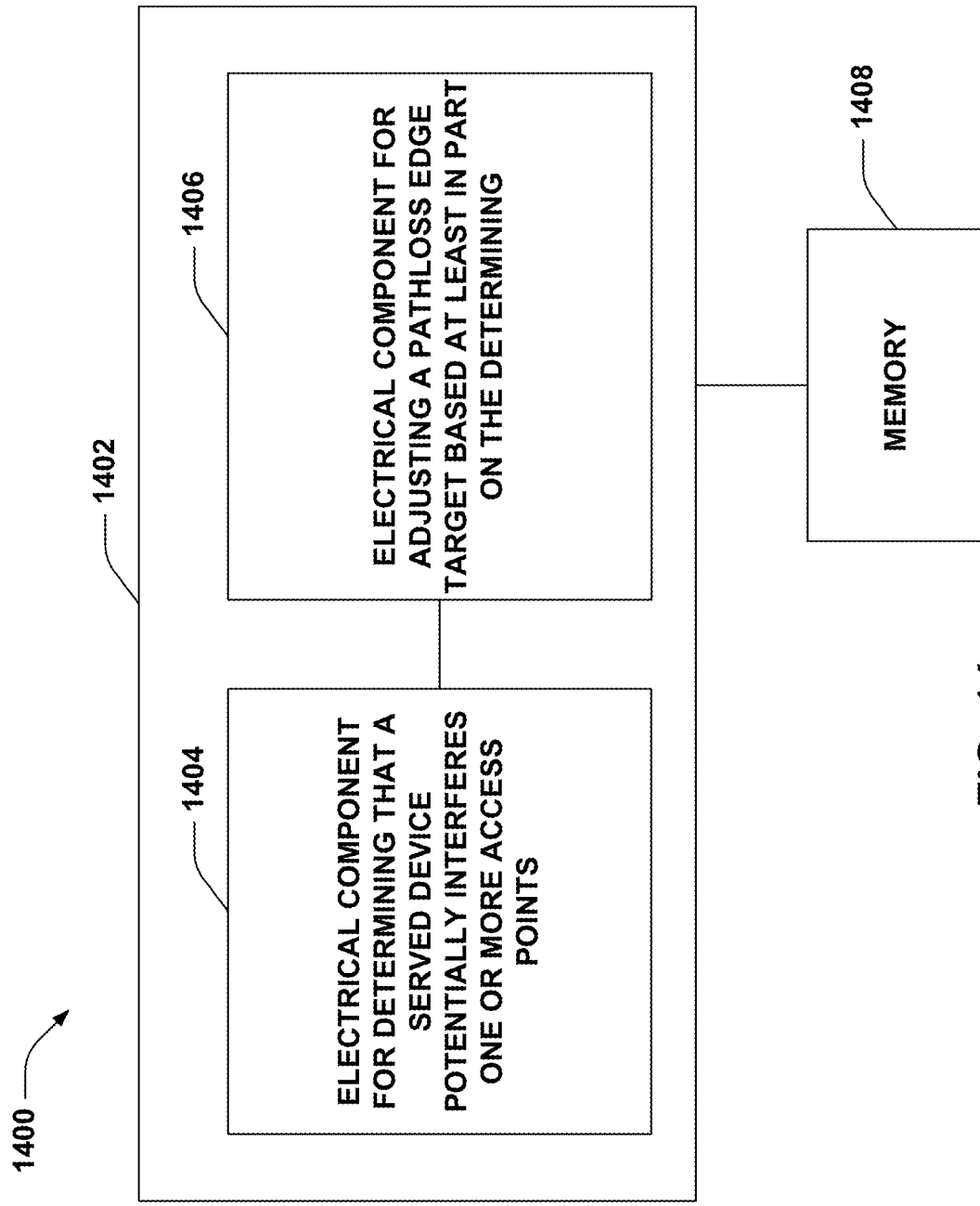
FIG. 14 is a block diagram of an example system that modifies a coverage area to mitigate device interference to other access points.

With reference to FIG. 14, illustrated is a system 1400 for determining a coverage area for an access point based on determined potential interference. For example, system 1400 can reside at least partially within an access point, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for determining that a served device potentially interferes with one or more access points 1404. As described, for example, this can be determined based on received measurements of the one or more access points from the served device, a determined pilot SNR reported by the served device, an indication from the one or more access points, etc.

Further, logical grouping 1402 can comprise an electrical component for adjusting a pathloss edge target based at least in part on the determining 1406. Thus, as described, the effective coverage area is modified based on the pathloss edge target, and potential interference can be mitigated since devices that would otherwise connect can connect with the one or more access points, and thus not cause interference thereto. For example, electrical component 1404 can include an interference determining component 508, as described above. In addition, for example, electrical component 1406, in an aspect, can include a pathloss edge target adjusting component 510, as described above.

Additionally, system 1400 can include a memory 1408 that retains instructions for executing functions associated with the electrical components 1404 and 1406. While shown as being external to memory 1408, it is to be understood that one or more of the electrical components 1404 and 1406 can exist within memory 1408. In one example, electrical components 1404 and 1406 can comprise at least one processor, or each electrical component 1404 and 1406 can be a corresponding module of at least one processor. Moreover, in an additional or alternative example, electrical components 1404 and 1406 can be a computer program product comprising a computer readable medium, where each electrical component 1404 and 1406 can be corresponding code.

Figure 15:
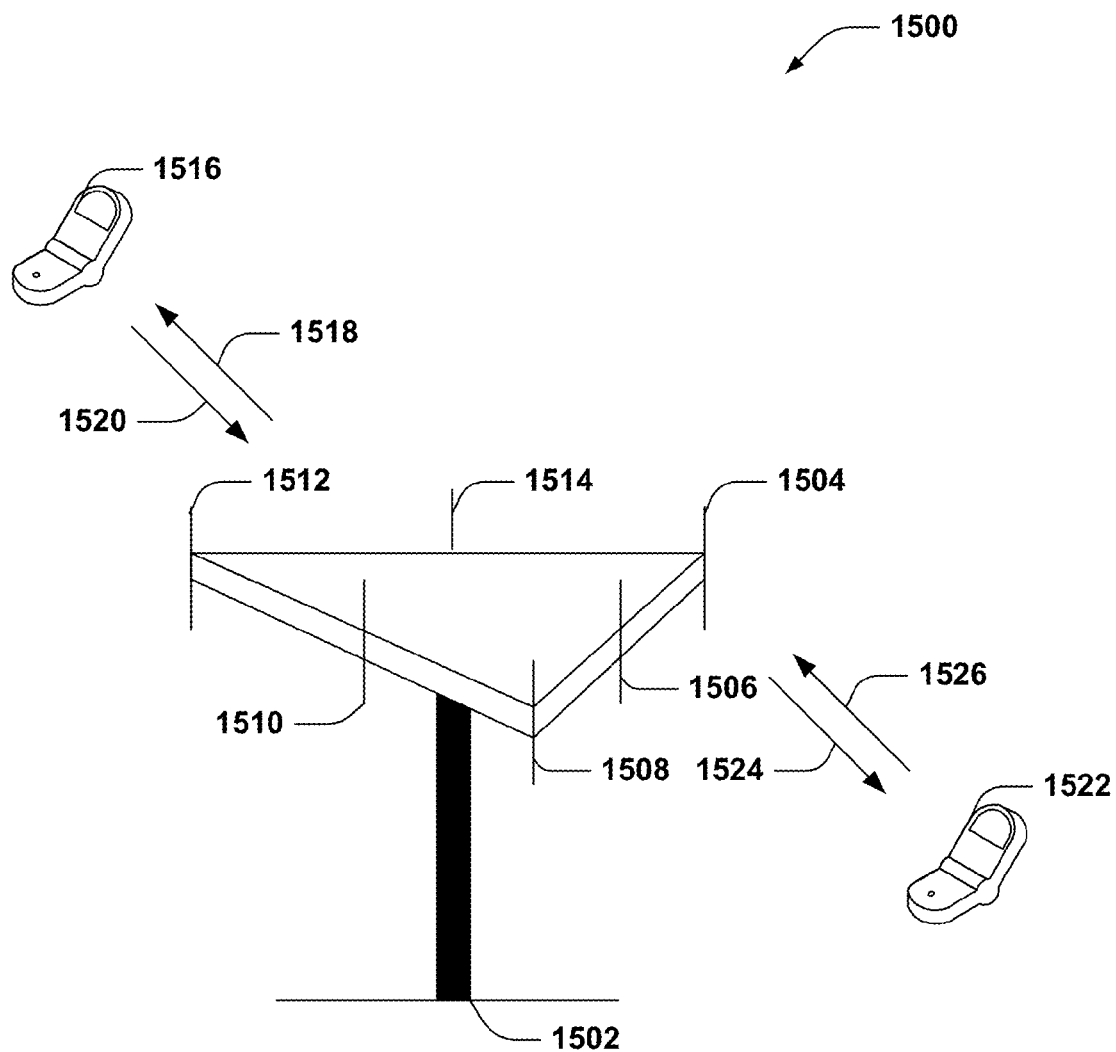
FIG. 15 is a block diagram of an example wireless communication system in accordance with various aspects set forth herein.

Referring now to FIG. 15, a wireless communication system 1500 is illustrated in accordance with various embodiments presented herein. System 1500 comprises a base station 1502 that can include multiple antenna groups. For example, one antenna group can include antennas 1504 and 1506, another group can comprise antennas 1508 and 1510, and an additional group can include antennas 1512 and 1514. Two antennas are illustrated for each antenna group; however, more or fewer antennas can be utilized for each group. Base station 1502 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1502 can communicate with one or more mobile devices such as mobile device 1516 and mobile device 1522; however, it is to be appreciated that base station 1502 can communicate with substantially any number of mobile devices similar to mobile devices 1516 and 1522. Mobile devices 1516 and 1522 can be, for example, cellular phones, smart phones, laptops, handheld communication devices, handheld computing devices, satellite radios, global positioning systems, PDAs, and/or any other suitable device for communicating over wireless communication system 1500. As depicted, mobile device 1516 is in communication with antennas 1512 and 1514, where antennas 1512 and 1514 transmit information to mobile device 1516 over a forward link 1518 and receive information from mobile device 1516 over a reverse link 1520. Moreover, mobile device 1522 is in communication with antennas 1504 and 1506, where antennas 1504 and 1506 transmit information to mobile device 1522 over a forward link 1524 and receive information from mobile device 1522 over a reverse link 1526. In a frequency division duplex (FDD) system, forward link 1518 can utilize a different frequency band than that used by reverse link 1520, and forward link 1524 can employ a different frequency band than that employed by reverse link 1526, for example. Further, in a time division duplex (TDD) system, forward link 1518 and reverse link 1520 can utilize a common frequency band and forward link 1524 and reverse link 1526 can utilize a common frequency band.

Each group of antennas and/or the area in which they are designated to communicate can be referred to as a sector of base station 1502. For example, antenna groups can be designed to communicate to mobile devices in a sector of the areas covered by base station 1502. In communication over forward links 1518 and 1524, the transmitting antennas of base station 1502 can utilize beamforming to improve signal-to-noise ratio of forward links 1518 and 1524 for mobile devices 1516 and 1522. Also, while base station 1502 utilizes beamforming to transmit to mobile devices 1516 and 1522 scattered randomly through an associated coverage, mobile devices in neighboring cells can be subject to less interference as compared to a base station transmitting through a single antenna to all its mobile devices. Moreover, mobile devices 1516 and 1522 can communicate directly with one another using a peer-to-peer or ad hoc technology as depicted. According to an example, system 1500 can be a multiple-input multiple-output (MIMO) communication system. In addition, for example, base station 1502 can set a IFHO threshold, data rate, etc., for a mobile device 1516 and/or 1522 based on determining potential interference to other access points, switch among access modes based on potential interference, boost a downlink transmit power based on potential interference, adjust a pathloss edge target, and/or the like, as described.

Figure 16:
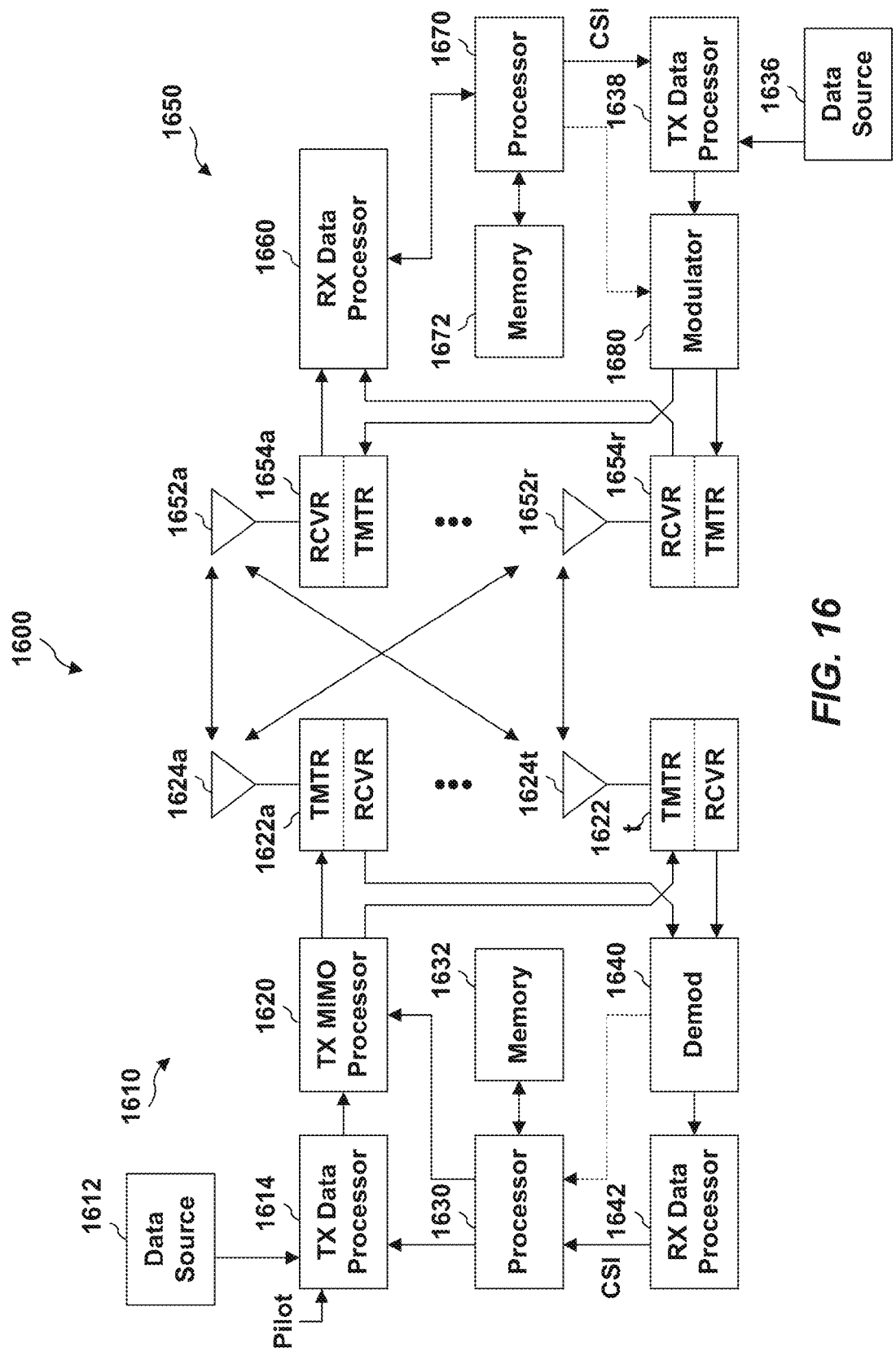
FIG. 16 is an illustration of an example wireless network environment that can be employed in conjunction with the various systems and methods described herein.

FIG. 16 shows an example wireless communication system 1600. The wireless communication system 1600 depicts one base station 1610 and one mobile device 1650 for sake of brevity. However, it is to be appreciated that system 1600 can include more than one base station and/or more than one mobile device, wherein additional base stations and/or mobile devices can be substantially similar or different from example base station 1610 and mobile device 1650 described below. In addition, it is to be appreciated that base station 1610 and/or mobile device 1650 can employ the systems (FIGS. 1-3, 5, and 10-15), boosting patterns (FIG. 4), and/or methods (FIGS. 6-9) described herein to facilitate wireless communication there between. For example, components or functions of the systems and/or methods described herein can be part of a memory 1632 and/or 1672 or processors 1630 and/or 1670 described below, and/or can be executed by processors 1630 and/or 1670 to perform the disclosed functions.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides $N_T$ modulation symbol streams to $N_T$ transmitters (TMTR) 1622a through 1622t. In various embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1622a through 1622t are transmitted from $N_T$ antennas 1624a through 1624t, respectively.

At mobile device 1650, the transmitted modulated signals are received by $N_R$ antennas 1652a through 1652r and the received signal from each antenna 1652 is provided to a respective receiver (RCVR) 1654a through 1654r. Each receiver 1654 conditions (e.g., filters, amplifies, and downconverts) a respective signal, digitizes the conditioned signal to provide samples, and further processes the samples to provide a corresponding "received" symbol stream.

An RX data processor 1660 can receive and process the $N_R$ received symbol streams from $N_R$ receivers 1654 based on a particular receiver processing technique to provide $N_T$ "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654a through 1654r, and transmitted back to base station 1610.

At base station 1610, the modulated signals from mobile device 1650 are received by antennas 1624, conditioned by receivers 1622, demodulated by a demodulator 1640, and processed by a RX data processor 1642 to extract the reverse link message transmitted by mobile device 1650. Further, processor 1630 can process the extracted message to determine which precoding matrix to use for determining the beamforming weights.

Processors 1630 and 1670 can direct (e.g., control, coordinate, manage, etc.) operation at base station 1610 and mobile device 1650, respectively. Respective processors 1630 and 1670 can be associated with memory 1632 and 1672 that store program codes and data. Processors 1630 and 1670 can determine or detect interference, adjust IFHO thresholds or data rates, switch access modes, boost transmit power, adjust pathloss edge targets, etc., as described.

Figure 17:
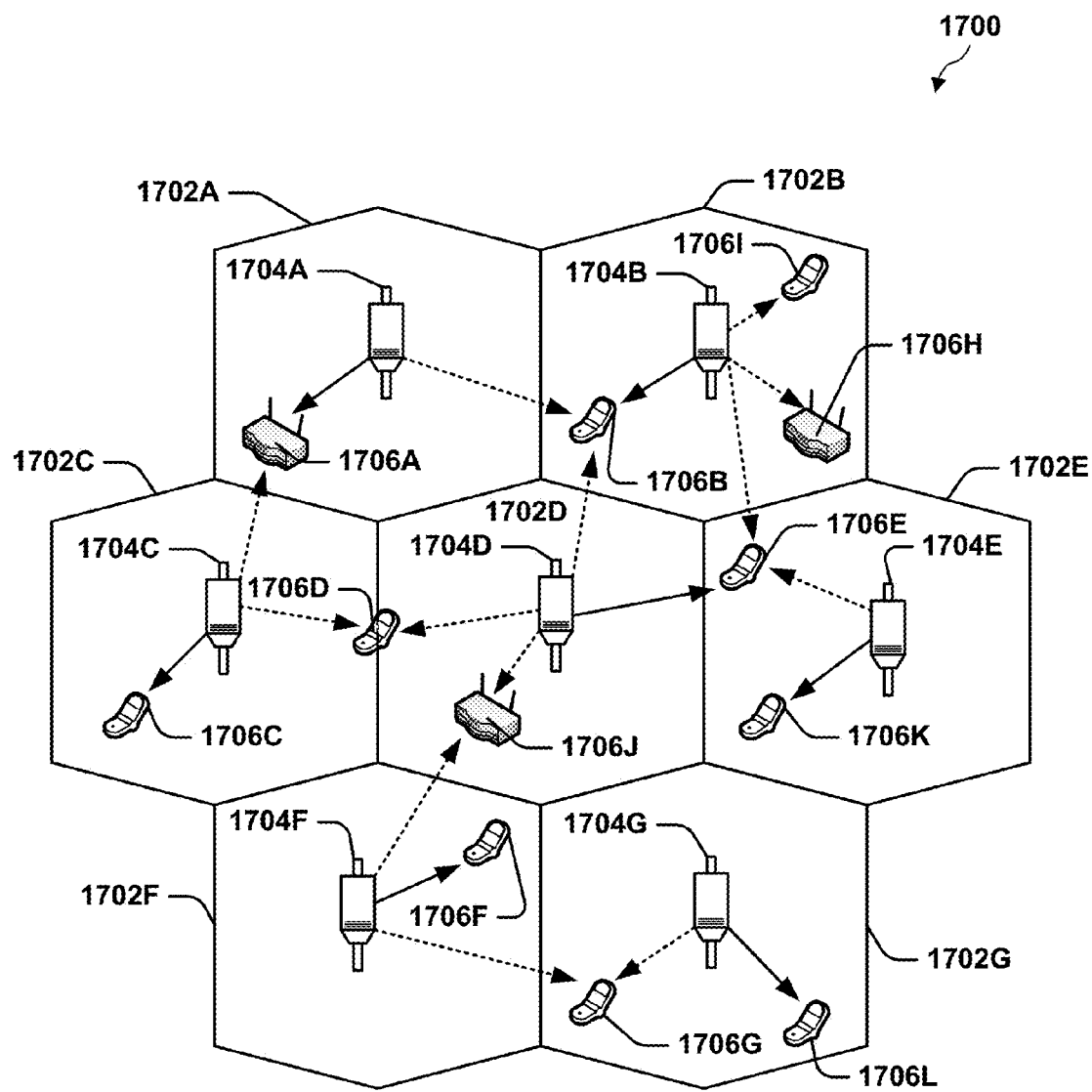
FIG. 17 illustrates an example wireless communication system, configured to support a number of devices, in which the aspects herein can be implemented.

FIG. 17 illustrates a wireless communication system 1700, configured to support a number of users, in which the teachings herein may be implemented. The system 1700 provides communication for multiple cells 1702, such as, for example, macro cells 1702A-1702G, with each cell being serviced by a corresponding access node 1704 (e.g., access nodes 1704A-1704G). As shown in FIG. 17, access terminals 1706 (e.g., access terminals 1706A-1706L) can be dispersed at various locations throughout the system over time. Each access terminal 1706 can communicate with one or more access nodes 1704 on a forward link (FL) and/or a reverse link (RL) at a given moment, depending upon whether the access terminal 1706 is active and whether it is in soft handoff, for example. The wireless communication system 1700 can provide service over a large geographic region.

Figure 18:
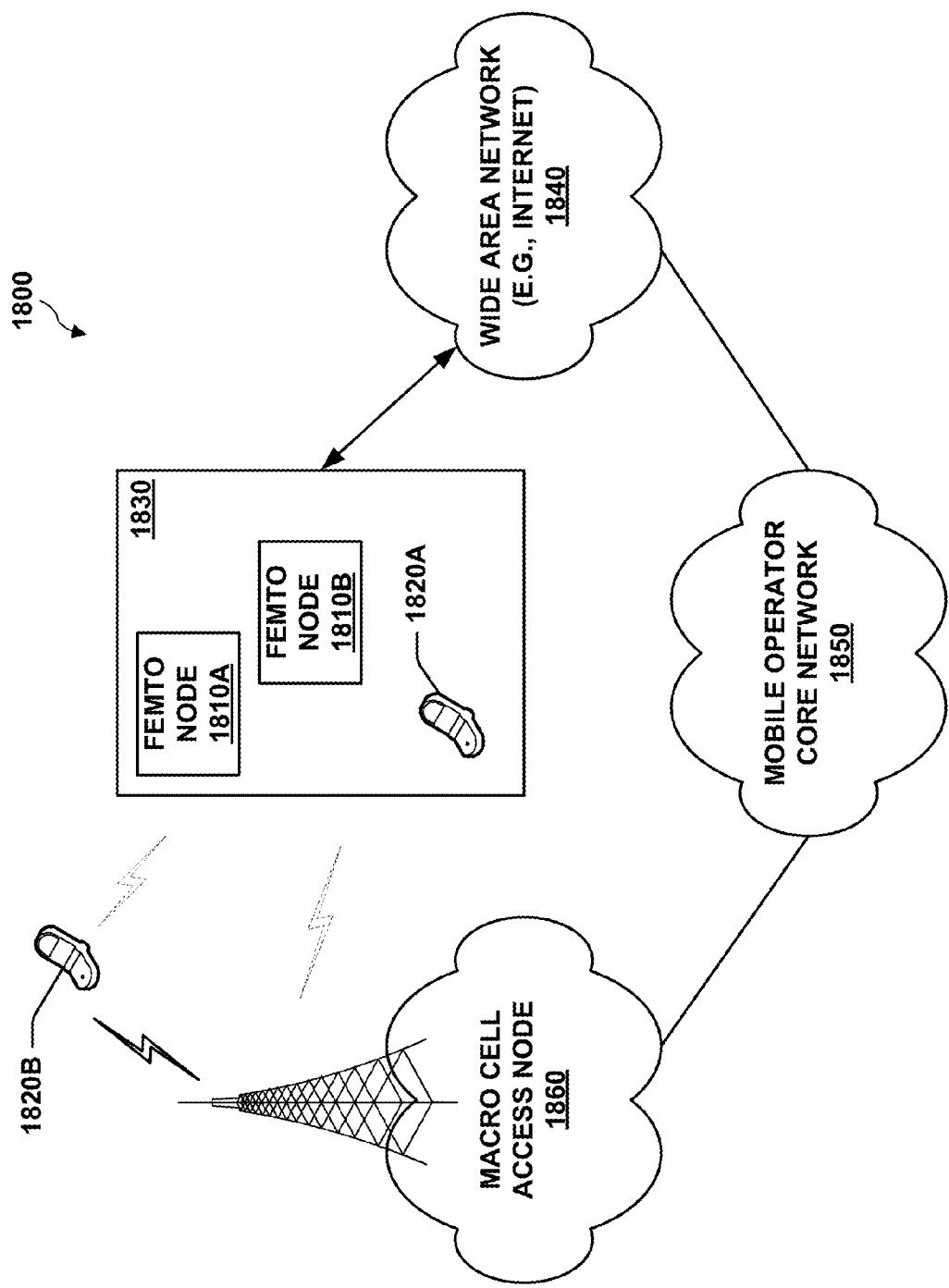
FIG. 18 is an illustration of an exemplary communication system to enable deployment of femtocells within a network environment.

FIG. 18 illustrates an exemplary communication system 1800 where one or more femto nodes are deployed within a network environment. Specifically, the system 1800 includes multiple femto nodes 1810A and 1810B (e.g., femtocell nodes or H(e)NB) installed in a relatively small scale network environment (e.g., in one or more user residences 1830). Each femto node 1810 can be coupled to a wide area network 1840 (e.g., the Internet) and a mobile operator core network 1850 via a digital subscriber line (DSL) router, a cable modem, a wireless link, or other connectivity means (not shown). As will be discussed below, each femto node 1810 can be configured to serve associated access terminals 1820 (e.g., access terminal 1820A) and, optionally, alien access terminals 1820 (e.g., access terminal 1820B). In other words, access to femto nodes 1810 can be restricted such that a given access terminal 1820 can be served by a set of designated (e.g., home) femto node(s) 1810 but may not be served by any non-designated femto nodes 1810 (e.g., a neighbor's femto node).

Figure 19:
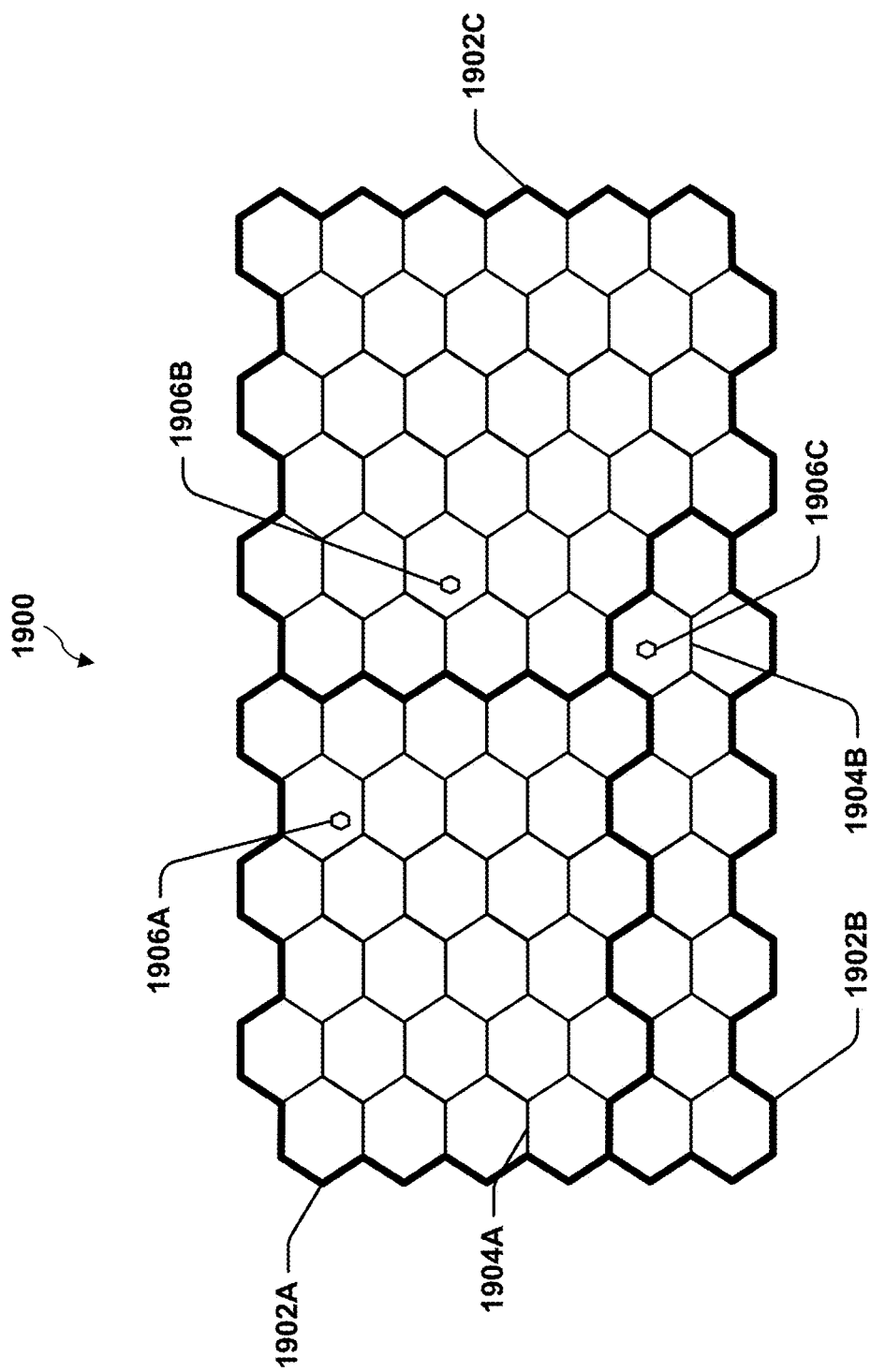
FIG. 19 illustrates an example of a coverage map having several defined tracking areas.

FIG. 19 illustrates an example of a coverage map 1900 where several tracking areas 1902 (or routing areas or location areas) are defined, each of which includes several macro coverage areas 1904. Here, areas of coverage associated with tracking areas 1902A, 1902B, and 1902C are delineated by the wide lines and the macro coverage areas 1904 are represented by the hexagons. The tracking areas 1902 also include femto coverage areas 1906. In this example, each of the femto coverage areas 1906 (e.g., femto coverage area 1906C) is depicted within a macro coverage area 1904 (e.g., macro coverage area 1904B). It should be appreciated, however, that a femto coverage area 1906 may not lie entirely within a macro coverage area 1904. In practice, a large number of femto coverage areas 1906 can be defined with a given tracking area 1902 or macro coverage area 1904. Also, one or more pico coverage areas (not shown) can be defined within a given tracking area 1902 or macro coverage area 1904.

Referring again to FIG. 18, the owner of a femto node 1810 can subscribe to mobile service, such as, for example, 3G mobile service, offered through the mobile operator core network 1850. In addition, an access terminal 1820 can be capable of operating both in macro environments and in smaller scale (e.g., residential) network environments. Thus, for example, depending on the current location of the access terminal 1820, the access terminal 1820 can be served by an access node 1860 or by any one of a set of femto nodes 1810 (e.g., the femto nodes 1810A and 1810B that reside within a corresponding user residence 1830). For example, when a subscriber is outside his home, he is served by a standard macro cell access node (e.g., node 1860) and when the subscriber is at home, he is served by a femto node (e.g., node 1810A). Here, it should be appreciated that a femto node 1810 can be backward compatible with existing access terminals 1820.

A femto node 1810 can be deployed on a single frequency or, in the alternative, on multiple frequencies. Depending on the particular configuration, the single frequency or one or more of the multiple frequencies can overlap with one or more frequencies used by a macro cell access node (e.g., node 1860). In some aspects, an access terminal 1820 can be configured to connect to a preferred femto node (e.g., the home femto node of the access terminal 1820) whenever such connectivity is possible. For example, whenever the access terminal 1820 is within the user's residence 1830, it can communicate with the home femto node 1810.

In some aspects, if the access terminal 1820 operates within the mobile operator core network 1850 but is not residing on its most preferred network (e.g., as defined in a preferred roaming list), the access terminal 1820 can continue to search for the most preferred network (e.g., femto node 1810) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1820 can limit the search for specific band and channel. For example, the search for the most preferred system can be repeated periodically. Upon discovery of a preferred femto node, such as femto node 1810, the access terminal 1820 selects the femto node 1810 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1810 that reside within the corresponding user residence 1830). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for mitigating interference in wireless communications, comprising:
    detecting, at a first access point, interference from one or more devices communicating with one or more serving access points other than the first access point; and
    increasing, at the first access point, a downlink transmit power over time based on detecting the interference, wherein the downlink transmit power is increased according to a boosting pattern in which the downlink transmit power is boosted for a first duration of time and the boosting of the downlink transmit power is increased for a second duration of time based at least on detecting the interference after the first duration of time.

2. An apparatus for mitigating interference in wireless communications, comprising:
    at least one processor configured to:
        detect interference from one or more devices communicating with one or more serving access points other than the apparatus; and
        increase a downlink transmit power over time based on the detected interference, wherein the downlink transmit power is increased according to a boosting pattern in which the downlink transmit power is boosted for a first duration of time and the boosting of the downlink transmit power is increased for a second duration of time based at least on detecting the interference after the first duration of time; and
    a memory coupled to the at least one processor.

3. An apparatus for mitigating interference in wireless communications, comprising:
    means for detecting interference from one or more devices communicating with one or more serving access points other than the apparatus; and
    means for increasing a downlink transmit power over time based on the detected interference, wherein the downlink transmit power is increased according to a boosting pattern in which the downlink transmit power is boosted for a first duration of time and the boosting of the downlink transmit power is increased for a second duration of time based at least on detecting the interference after the first duration of time.

4. A non-transitory computer-readable medium for mitigating interference in wireless communications, comprising:
    code for causing a first access point to detect interference from one or more devices communicating with one or more serving access points other than the first access point; and
    code for causing the first access point to increase a downlink transmit power over time based on the detected interference, wherein the downlink transmit power is increased according to a boosting pattern in which the downlink transmit power is boosted for a first duration of time and the boosting of the downlink transmit power is increased for a second duration of time based at least on detecting the interference after the first duration of time.

5. An apparatus for mitigating interference in wireless communications, comprising:
    an interference detecting component configured to detect interference from one or more devices communicating with one or more serving access points other than the apparatus; and
    a downlink transmit component configured to increase a downlink transmit power over time based on the detected interference, wherein the downlink transmit power is increased according to a boosting pattern in which the downlink transmit power is boosted for a first duration of time and the boosting of the downlink transmit power is increased for a second duration of time based at least on detecting the interference after the first duration of time.

6. The method recited in claim 1, wherein the downlink transmit power is increased to cause interference at the one or more devices from which the interference was detected.

7. The method recited in claim 1, wherein the downlink transmit power is increased to cause an inter-frequency handover at the one or more devices from which the interference was detected.

8. The method recited in claim 1, further comprising lowering the downlink transmit power to an original level during a period between the first duration of time and the second duration of time.

9. The method recited in claim 1, wherein the boosting pattern groups the first duration of time and the second duration of time into a cluster of bursts, and wherein the method further comprises returning the downlink transmit power to an original level for an extended time duration after a last burst in the cluster of bursts.

10. The apparatus recited in claim 2, wherein the downlink transmit power is increased to cause interference at the one or more devices from which the interference was detected.

11. The apparatus recited in claim 2, wherein the downlink transmit power is increased to cause an inter-frequency handover at the one or more devices from which the interference was detected.

12. The apparatus recited in claim 2, wherein the at least one processor is further configured to lower the downlink transmit power to an original level during a period between the first duration of time and the second duration of time.

13. The apparatus recited in claim 2, wherein the boosting pattern groups the first duration of time and the second duration of time into a cluster of bursts, and wherein the at least one processor is further configured to return the downlink transmit power to an original level for an extended time duration after a last burst in the cluster of bursts.

14. The apparatus recited in claim 3, wherein the downlink transmit power is increased to cause interference at the one or more devices from which the interference was detected.

15. The apparatus recited in claim 3, wherein the downlink transmit power is increased to cause an inter-frequency handover at the one or more devices from which the interference was detected.

16. The apparatus recited in claim 3, further comprising means for lowering the downlink transmit power to an original level during a period between the first duration of time and the second duration of time.

17. The apparatus recited in claim 3, wherein the boosting pattern groups the first duration of time and the second duration of time into a cluster of bursts, and wherein the apparatus further comprises means for returning the downlink transmit power to an original level for an extended time duration after a last burst in the cluster of bursts.

18. The non-transitory computer-readable medium recited in claim 4, wherein the downlink transmit power is increased to cause interference at the one or more devices from which the interference was detected.

19. The non-transitory computer-readable medium recited in claim 4, wherein the downlink transmit power is increased to cause an inter-frequency handover at the one or more devices from which the interference was detected.

20. The non-transitory computer-readable medium recited in claim 4, further comprising code for causing the first access point to lower the downlink transmit power to an original level during a period between the first duration of time and the second duration of time.

21. The non-transitory computer-readable medium recited in claim 4, wherein the boosting pattern groups the first duration of time and the second duration of time into a cluster of bursts, and wherein the non-transitory computer-readable medium further comprises code for causing the first access point to return the downlink transmit power to an original level for an extended time duration after a last burst in the cluster of bursts.

22. The apparatus recited in claim 5, wherein the downlink transmit power is increased to cause interference at the one or more devices from which the interference was detected.

23. The apparatus recited in claim 5, wherein the downlink transmit power is increased to cause an inter-frequency handover at the one or more devices from which the interference was detected.

24. The apparatus recited in claim 5, wherein the downlink transmit component is further configured to lower the downlink transmit power to an original level during a period between the first duration of time and the second duration of time.

25. The apparatus recited in claim 5, wherein the boosting pattern groups the first duration of time and the second duration of time into a cluster of bursts, and wherein the downlink transmit component is further configured to return the downlink transmit power to an original level for an extended time duration after a last burst in the cluster of bursts.

* * * * *